United States Patent
Livazovic et al.

(10) Patent No.: US 11,117,103 B2
(45) Date of Patent: Sep. 14, 2021

(54) METHODS OF FILTERING HYDROCARBONS FROM AN AQUEOUS MIXTURE

(71) Applicant: King Abdullah University of Science and Technology, Thuwal (SA)

(72) Inventors: Sara Livazovic, Thuwal (SA); Suzana Nunes, Thuwal (SA)

(73) Assignee: KING ABDULLAH UNIVERSITY OF SCIENCE AND TECHNOLOGY, Thuwal (SA)

(*) Notice: Subject to any disclaimer, the term of this patent is extended or adjusted under 35 U.S.C. 154(b) by 32 days.

(21) Appl. No.: 16/336,176

(22) PCT Filed: Sep. 26, 2017

(86) PCT No.: PCT/IB2017/055865
§ 371 (c)(1),
(2) Date: Mar. 25, 2019

(87) PCT Pub. No.: WO2018/055602
PCT Pub. Date: Mar. 29, 2018

(65) Prior Publication Data
US 2019/0209976 A1     Jul. 11, 2019

Related U.S. Application Data

(60) Provisional application No. 62/399,519, filed on Mar. 26, 2016.

(51) Int. Cl.
*B01D 71/10* (2006.01)
*B01D 61/14* (2006.01)
(Continued)

(52) U.S. Cl.
CPC ........... *B01D 71/10* (2013.01); *B01D 61/145* (2013.01); *B01D 67/0013* (2013.01);
(Continued)

(58) Field of Classification Search
CPC .... B01D 17/085; B01D 61/145; B01D 69/02; B01D 69/08; B01D 71/16; B01D 67/0013; B01D 71/10; C02F 1/444
See application file for complete search history.

(56) References Cited

U.S. PATENT DOCUMENTS

| | | | | |
|---|---|---|---|---|
| 4,425,239 A | * | 1/1984 | Jacocks | B01D 17/0208 210/787 |
| 2009/0078640 A1 | | 3/2009 | Chu et al. | |
| 2018/0296985 A1 | * | 10/2018 | Mukherjee | C09K 8/584 |

FOREIGN PATENT DOCUMENTS

| | | |
|---|---|---|
| EP | 2199319 A1 | 6/2010 |
| WO | 2003015903 A1 | 2/2003 |

OTHER PUBLICATIONS

Notification of Transmittal of the International Search Report and the Written Opinion of the International Searching Authority, or the Declaration for PCT/IB2017/055865 dated Sep. 26, 2017.

(Continued)

*Primary Examiner* — Krishnan S Menon
(74) *Attorney, Agent, or Firm* — Billion & Armitage

(57) ABSTRACT

A method of separating hydrocarbons in an aqueous mixture comprising exposing the aqueous mixture to a cellulose/ionic liquid membrane, wherein the aqueous mixture includes hydrocarbons, and removing the hydrocarbons from the aqueous mixture as the aqueous mixture flows through the cellulose/ionic liquid membrane, wherein the hydrocarbons do not flow through the cellulose/ionic liquid membrane. A filter system, comprising a cellulose/ionic liquid membrane used as the filter to separate hydrocarbons from an aqueous mixture.

12 Claims, 18 Drawing Sheets

(51) Int. Cl.
    C02F 1/44      (2006.01)
    B01D 67/00     (2006.01)
    C02F 101/32    (2006.01)
    C02F 103/36    (2006.01)
    B01D 3/14      (2006.01)
    C02F 103/10    (2006.01)
(52) U.S. Cl.
    CPC ............ C02F 1/444 (2013.01); B01D 3/145
        (2013.01); C02F 2101/32 (2013.01); C02F
        2103/10 (2013.01); C02F 2103/365 (2013.01)

(56) References Cited

OTHER PUBLICATIONS

Zetasizer Nano Range, Malvern Instruments Ltd., Retreived from "https://www.malvernpanalytical.com/en/products/product-range/zetasizer-range/zetasizer-nano-range", on Mar. 25, 2019, 10 pages.
Abdelrasoul, et al., "Fouling in Membrane Filtration and Remediation Methods", Mass Transfer—Advances in Sustainable Energy and Environment Oriented Numerical Modeling, 2013, pp. 195-218.
Ashaghi, et al., "Ceramic Ultra- and Nanofiltration Membranes for Oilfield Produced Water Treatment: A Mini Review", Open Environmental Sciences, vol. 1, 2007, pp. 1-8.
Bader, "Seawater Versus Produced Water in Oil-Fields Water Injection Operations", Desalination, vol. 208, 2007, pp. 159-168.
Bilstad, et al., "Membrane separation of produced water", Water Science and Technology, vol. 34, No. 9, 1996, pp. 239-246.
Chakrabarty, et al., "Ultrafiltration of Stable Oil-in-Water Emulsion by Polysulfone Membrane", Journal of Membrane Science, vol. 325, 2008, pp. 427-437.
Chen, et al., "Removal of Oil, Grease, and Suspended Solids From Produced Water With Ceramic Crossflow Microfiltration", SPE Production Engineering, vol. 6, May 1991, pp. 131-136.
Chen, et al., "Surface Modification of Poly (Ether Sulfone) Ultrafiltration Membranes by Low-Temperature Plasma-Induced Graft Polymerization", Journal of Applied Polymer Science, vol. 72, 1999, pp. 1699-1711.
Chen, et al., "The Improved Oil/Water Separation Performance of Cellulose Acetate-Graft-Polyacrylonitrile Membranes", Journal of Membrane Science, vol. 337, 2009, pp. 98-105.
Chu, et al., "Surface Modification of Ceramic-Supported Polyethersulfone Membranes by Interfacial Polymerization for Reduced Membrane Fouling", Macromolecular Chemistry and Physics, vol. 206, 2005, pp. 1934-1940.
El-Kayar, et al., "Removal of Oil From Stable Oil-Water Emulsion by Induced Air Flotation Technique", Separations Technology, vol. 3, Jan. 1993, pp. 25-31.
Fakhru'l-Razi, et al., "Review of Technologies for Oil and Gas Produced Water Treatment", Journal of Hazardous Materials, vol. 170, 2009, pp. 530-551.
Field, "Fundamentals of Fouling", Membranes for Water Treatment, vol. 4, 2010, pp. 1-23.
Hester, et al., "Preparation of Protein-Resistant Surfaces on Poly (Vinylidene Fluoride) Membranes via Surface Segregation", Macromolecules, vol. 32, No. 5, Feb. 18, 1999, pp. 1643-1650.
Hong, et al., "Factors Affecting Membrane Coalescence of Stable Oil-in-Water Emulsions", Journal of Membrane Science, vol. 222, 2003, pp. 19-39.
Jacobs et al., "The Composition of Produced Water From Shell Operated Oil and Gas Production in the North Sea", Produced Water, 1992, pp. 13-21.
Knudsen, et al., "Meeting the Zero Discharge Challenge for Produced Water", SPE International Conference on Health, Safety, and Environment in Oil and Gas Exploration and Production, 2004, pp. 1-6.
Krizan, et al., "Recent Developments in Membrane Treatment of Spent Cutting-Oils: A Review", Industrial & Engineering Chemistry Research, vol. 52, Apr. 23, 2013, pp. 1-51.
Lee, et al., "Treatment of Produced Water With an Ultrafiltration (UF) Membrane—A Field Trial", SPE Annual Technical Conference and Exhibition, 2005, pp. 1-6.
Li, et al., "Development and Characterization of Anti-Fouling Cellulose Hollow Fiber UF Membranes for Oil-Water Separation", Journal of Membrane Science, vol. 279, 2006, pp. 328-335.
Li, et al., "Treatment of Oily Wastewater by Organic-Inorganic Composite Tubular Ultrafiltration (UF) Membranes", Desalination, vol. 196, 2006, pp. 76-83.
Livazovic, et al., "Cellulose Multilayer Membranes Manufacture With Ionic Liquid", Journal of Membrane Science, vol. 490, 2015, pp. 282-293.
Lu, et al., "Ceramic Membrane Fouling during Ultrafiltration of Oil/Water Emulsions: Roles Played by Stabilization Surfactants of Oil Droplets", Environmental Science & Technology, vol. 49, Mar. 2, 2015, pp. 4235-4244.
Lv, et al., "Enhanced Permeation Performance of Cellulose Acetate Ultrafiltration Membrane by Incorporation of Pluronic F127", Journal of Membrane Science, vol. 294, 2007, pp. 68-74.
Melin, et al., "Membrane Processes", Springer Berlin Heidelberg, 2007, 16 pages (English Translation of p. 48 only).
Neff, "Bioaccumulation in Marine Organisms: Effect of Contaminants From Oil Well Produced Water", Elsevier, 2002.
Nunes, et al., "Dense Hydrophilic Composite Membranes for Ultrafiltration", Journal of Membrane Science, vol. 106, 1995, pp. 49-56.
Pieracci, et al., "UV-Assisted Graft Polymerization of N-Vinyl-2-pyrrolidinone onto Poly(ether sulfone) Ultrafiltration Membranes Using Selective UV Wavelengths", Chemistry of Materials, vol. 14, No. 1, 2002, pp. 256-265.
Pitre, "Produced Water Discharges into Marine Ecosystems", Offshore Technology Conference, 1984, 6 pages.
Plebon, et al., "Further Advances in Produced Water De-Oiling Utilizing a Technology That Removes and Recovers Dispersed Oil in Produced Water 2 Microns and Larger", 12th International Petroleum Environmental Conference, 2005, pp. 1-20.
Reddy, et al., "Surface Modification of Ultrafiltration Membranes by Preadsorption of a Negatively Charged Polymer I. Permeation of Water Soluble Polymers and Inorganic Salt Solutions and Fouling Resistance Properties", Journal of Membrane Science, vol. 214, 2003, pp. 211-221.
Seureau, et al., "A Three-Phase Separator for the Removal of Oil and Solids From Produced Water", SPE Annual Technical Conference and Exhibition, 1994, pp. 193-202.
Shi, et al., "Zwitterionic Polyethersulfone Ultrafiltration Membrane With Superior Antifouling Property", Journal of Membrane Science, vol. 319, 2008, pp. 271-278.
Sivakumar, et al., "Studies on Cellulose Acetate-Polysulfone Ultrafiltration Membranes II. Effect of Additive Concentration", Journal of Membrane Science, vol. 268, 2006, pp. 208-219.
Su, et al., "Modification of Polyethersulfone Ultrafiltration Membranes With Phosphorylcholine Copolymer Can Remarkably Improve the Antifouling and Permeation Properties", Journal of Membrane Science, vol. 322, 2008, pp. 171-177.
Tang, et al., "Colloidal Interactions and Fouling of NF and RO Membranes: A Review", Advances in Colloid and Interface Science, vol. 164, 2011, pp. 126-143.
Tellez, et al., "Performance Evaluation of an Activated Sludge System for Removing Petroleum Hydrocarbons From Oilfield Produced Water", Advances in Environmental Research, vol. 6, 2002, pp. 455-470.
Ulbricht, et al., "Surface Modification of Ultrafiltration Membranes by Low Temperature Plasma II. Graft Polymerization Onto Polyacrylonitrile and Polysulfone", Journal of Membrane Science, vol. 111, 1996, pp. 193-215.
Wang, et al., "Remarkable Reduction of Irreversible Fouling and Improvement of the Permeation Properties of Poly (ether sulfone) Ultrafiltration Membranes by Blending with Pluronic F127", Langmuir, vol. 21, No. 25, 2005, pp. 11856-11862.

(56) References Cited

OTHER PUBLICATIONS

Ye, et al., "Novel Cellulose Acetate Membrane Blended With Phospholipid Polymer for Hemocompatible Filtration System", Journal of Membrane Science, vol. 210, 2002, pp. 411-421.
Zhao, et al., "Modification of Polyethersulfone Membranes—A Review of Methods", Progress in Materials Science, vol. 58, 2013, pp. 76-150.

* cited by examiner

METHODS OF FILTERING HYDROCARBONS FROM AN AQUEOUS MIXTURE

BACKGROUND

Increases in world population have directly increased the demand for industrial growth. In order for industry to grow, it requires energy, mainly originating from the crude oil. Crude oil is used in a variety of industries, where 40% is used for gasoline and the balance is used for a whole range of products, such as jet fuel, plastics, and industrial chemicals. One 42 gallon barrel of oil produces 19 gallons of gasoline and the rest is used to produce products, such as clothes, cosmetics, plastics, sport accessories, tires, wheels, and many more.

According to the International Energy Agency, for every barrel of crude oil, 7 to 10 barrels of water are needed for extraction. In 2015, 96 billion barrels of crude oil were extracted. Therefore there is an extreme need for produced water management and proper removal of the oil from water.

Oil in the water can be classified as floated or dispersed oil where the oil droplets size is higher than 10 µm and they can be removed mechanically. The other case is where oil droplets are less than 10 µm, which is classified as emulsified oil creating an oil in water (O/W) emulsion.

Due to its small size, emulsified oil is difficult to remove using common techniques such as physical treatment, chemical treatment, and biological treatment. Gravity separation, flocculation, coagulation, and air flotation are not effective in removing micron and sub-micron sized oil droplets in the emulsion.

The EARTH Canada Corporation developed a technology called TORR™ that stands for Total Oil Remediation and Recovery. They use a multi-stage adsorption and separation system that has an adsorbent media, the polyurethane-based Reusable Petroleum Adsorbent (RPA®) that is oleophilic, hydrophobic, nontoxic, coalescing agent capable of removing and recovering big and small oil droplets. The drawback of adsorption systems is cost, need for frequent regeneration of materials, and waste generation.

Oily wastewater is one of the largest by-products of food industry, chemical and petrochemical industry and, in largest percentage, petroleum refineries. Conventional gravity separation techniques such as skimming, air flotation, coagulation, and flocculation methods proved to be ineffective in treatment of micron/sub-micron oil droplets dispersed in water.

Membranes have become a powerful technology for oil in water separations due to the tailored pore sizes, making them applicable for a wide range of oil droplet sizes ranging from 0.1-10 µm. Hydrophobic membranes including polysulfone, polyethersulfone, polyacrylonitrile, etc. have proven efficient in separating oil droplets from water but with severe fouling. Modification of the surface to make it more hydrophilic has become a trend with methods such as surface segregation, surface coating, and surface graft polymerisation. These techniques have been performed on hydrophobic and hydrophilic membranes as well as ceramic. However, they require additional steps, which increase the cost and preparation time.

UF membranes are effective systems for oily wastewater treatment due to its low cost, small space requirements, and no need for additives. Lia et al. studied a tubular UF model equipped with polyvinylidene fluoride membranes modified by inorganic nano-sized aluminum particles to treat oilfield-produced water. Li, Y. S.; Yan, L.; Xiang, C. B.; Hong, L. J., Treatment of oily wastewater by organic-inorganic composite tubular ultrafiltration (UF) membranes. *Desalination* 2006, 196, (1), 76-83. Bilstad and Espedal et al. compared MF and UF membranes in a pilot trial to treat the North Sea oilfield-produced water. Bilstad, T.; Espedal, E., Membrane separation of produced water. *Water Science and Technology* 1996, 34, (9), 239-246. Results showed that UF, but not MF, could meet effluent standards for total hydrocarbons, SS, and dissolved constituents. By UF membrane treatment with molecular weight cut-off (MWCO) was between 100,000 and 200,000 Da, total hydrocarbon concentration could be reduced to 2 mg/L from 50 mg/L (96% removal). Benzene, toluene, and xylene (BTX) were reduced by 54%, and some heavy metals like Cu, and Zn were removed to the extent of 95%.

Lee and Frankiewicz et al. tested a hydrophilic UF membrane of 0.01-µm pore size, in crossflow mode to treat oilfield-produced water. (Lee, J. M.; Frankiewicz, T. C. In *Treatment of produced water with an ultrafiltration (UF) membrane-a field trial*, SPE Annual Technical Conference and Exhibition, 2005; Society of Petroleum Engineers: 2005.) Oil and gas concentration after UF could be reduced to less than 2 mg/L. The preferred feed-water specification for ideal performance of UF was oil and solids less than 50 and 15 ppm, respectively.

A hydrocyclone was first used to desand and de-oil the wastewater. The hydrocyclone pretreated the raw produced water removing solids and oil content by 73% and 54%, respectively.

Cyclones combine centrifugal forces and gas flotation to separate water, oil and gas. (Knudsen, B.; Hjelsvold, M.; Frost, T.; Svarstad, M.; Grini, P.; Willumsen, C.; Torvik, H. In *Meeting the zero discharge challenge for produced water*, SPE International Conference on Health, Safety, and Environment in Oil and Gas Exploration and Production, 2004; Society of Petroleum Engineers: 2004; Seureau, J.; Aurelle, Y.; Hoyack, M. In *A three-phase separator for the removal of oil and solids from produced water*, SPE Annual Technical Conference and Exhibition, 1994; Society of Petroleum Engineers: 1994.) It is accepted fact that hydrophilic membranes show better antifouling properties and possess higher permeability. Several groups have worked on making the membrane surfaces more hydrophilic with techniques such as surface graft polymerization (Ulbricht, M.; Belfort, G., Surface modification of ultrafiltration membranes by low temperature plasma II. Graft polymerization onto polyacrylonitrile and polysulfone. *Journal of Membrane Science* 1996, 111, (2), 193-215; Chen, H.; Belfort, G., Surface modification of poly (ether sulfone) ultrafiltration membranes by low-temperature plasma-induced graft polymerization. *Journal of Applied Polymer Science* 1999, 72, (13), 1699-1711; Pieracci, J.; Crivello, J. V.; Belfort, G., UV-assisted graft polymerization of N-vinyl-2-pyrrolidinone onto poly (ether sulfone) ultrafiltration membranes using selective UV wavelengths. *Chemistry of materials* 2002, 14, (1), 256-265), surface coating (Reddy, A.; Mohan, D. J.; Bhattacharya, A.; Shah, V.; Ghosh, P., Surface modification of ultrafiltration membranes by preadsorption of a negatively charged polymer: I. Permeation of water soluble polymers and inorganic salt solutions and fouling resistance properties. *Journal of Membrane Science* 2003, 214, (2), 211-221; Nunes, S. P.; Sforca, M. L.; Peinemann, K.-V., Dense hydrophilic composite membranes for ultrafiltration. *Journal of Membrane Science* 1995, 106, (1), 49-56), and surface segregation (Hester, J.; Banerjee, P.; Mayes, A., Preparation of protein-resistant surfaces on poly (vinylidene fluoride) membranes via surface segregation. *Macromol-* ecules 1999, 32, (5), 1643-1650; Wang, Y.-q.; Wang, T.; Su, Y.-l.; Peng, F.-b.; Wu, H.; Jiang, Z.-y., Remarkable reduction of irreversible fouling and improvement of the permeation properties of poly (ether sulfone) ultrafiltration membranes by blending with pluronic F127. *Langmuir* 2005, 21, (25), 11856-11862; Su, Y.; Li, C.; Zhao, W.; Shi, Q.; Wang, H.; Jiang, Z.; Zhu, S., Modification of polyethersulfone ultrafiltration membranes with phosphorylcholine copolymer can remarkably improve the antifouling and permeation properties. *Journal of Membrane Science* 2008, 322, (1), 171-177; Shi, Q.; Su, Y.; Zhao, W.; Li, C.; Hu, Y.; Jiang, Z.; Zhu, S., Zwitterionic polyethersulfone ultrafiltration membrane with superior antifouling property. *Journal of Membrane Science* 2008, 319, (1), 271-278).

Jiang et al. stated that oil/water separation improved with cellulose grafted polyacrylonitrile membranes. They showed that the membranes reject 100% of high-speed vacuum pump oil using UV-VIS. (Chen, W.; Su, Y.; Zheng, L.; Wang, L.; Jiang, Z., The improved oil/water separation performance of cellulose acetate-graft-polyacrylonitrile membranes. *Journal of Membrane Science* 2009, 337, (1), 98-105)

Li et al. prepared hollow fibre membranes from cellulose/monohydrate N-methylmorpholine-N-oxide ($NMMO.H_2O$)/polyethylene glycol (PEG 400) through the immersion precipitation technique. (Li, H.-J.; Cao, Y.-M.; Qin, J.-J.; Jie, X.-M.; Wang, T.-H.; Liu, J.-H.; Yuan, Q., Development and characterization of anti-fouling cellulose hollow fiber UF membranes for oil-water separation. *Journal of Membrane science* 2006, 279, (1), 328-335) The membranes showed good antifouling properties but the permeability was relatively low, 7.67 Lm−2h−1 under an operation pressure of 0.1 MPa.

Ishihara et al. incorporated phospholipids into cellulose acetate membranes to improve the speed of filtration for hemodialysis and compatibility purposes.

Several other researchers incorporated additives to improve the permeability. (Ye, S. H.; Watanabe, J.; Iwasaki, Y.; Ishihara, K., Novel cellulose acetate membrane blended with phospholipid polymer for hemocompatible filtration system. *Journal of Membrane Science* 2002, 210, (2), 411-421)

Jiang et al. included Pluronic 127 into cellulose acetate UF membranes for permeance enhancement. (Lv, C.; Su, Y.; Wang, Y.; Ma, X.; Sun, Q.; Jiang, Z., Enhanced permeation performance of cellulose acetate ultrafiltration membrane by incorporation of Pluronic F127. *Journal of membrane science* 2007, 294, (1), 68-74) Rangarajan et al. (2006) prepared phase inversion membranes from casting solution containing cellulose acetate-polysulfone-polyvinylpyrrolidone to improve the permeability. (Sivakumar, M.; Mohan, D. R.; Rangarajan, R., Studies on cellulose acetate-polysulfone ultrafiltration membranes: II. Effect of additive concentration. *Journal of Membrane Science* 2006, 268, (2), 208-219).

Techniques for making the surface more hydrophilic are attractive but there require additional cost, usage of potentially harsh materials and scaling up challenges.

Ceramic membranes are interesting topic in membrane technology field and recently have more attention in the produced water industry. (Shams Ashaghi, K.; Ebrahimi, M.; Czermak, P., Ceramic ultra- and nanofiltration membranes for oilfield produced water treatment: a mini review. *Open Environmental Sciences* 2007, 1, (1)). Due to their inorganic composition they possess competitive mechanical and chemical stability, can withstand higher temperatures, high oil concentration and harsh cleaning agents. (Bader, M., Seawater versus produced water in oil-fields water injection operations. *Desalination* 2007, 208, (1), 159-168). Although they tolerate high temperatures, the expansion may cause problems with sealing between membrane and the housing. (Melin, T.; Rautenbach, R., Membranverfahren. Springer Berlin Heidelberg: 2007.) They are brittle, which makes it difficult to handle, they are quite expensive compared to polymeric membranes and are challenging to scale up given the cost and currently available ratio of membrane area and permeability.

Chen et al. tested performance of ceramic crossflow MFs to separate oil, grease, and SS from produced water. (Chen, A.; Flynn, J.; Cook, R.; Casaday, A., Removal of oil, grease, and suspended solids from produced water with ceramic crossflow microfiltration. *SPE production engineering* 1991, 6, (02), 131-136.) Permeate quality of dispersed oil and gas was 5 mg/L and of SS was less than 1 mg/L.

Tao and Ma et al. investigated reversible and irreversible fouling on ceramic membranes. They stated that specification and type of the crude oil affect the droplet size and zeta potential which later affects the separation efficiency in the ceramic membrane test. (Lu, D.; Zhang, T.; Ma, J., Ceramic membrane fouling during ultrafiltration of oil/water emulsions: Roles played by stabilization surfactants of oil droplets. *Environmental science & technology* 2015, 49, (7), 4235-4244).

Biggest challenge that affects the membranes in oil and gas industry is fouling. Fouling is causing decreased membrane productivity due to the accumulation of particles of different origin on the membrane. Less productivity means permeate with poor quality, more energy consumption and overall increase of plan operation cost. Membranes have to be replaced more often or backwash has to be implemented more frequently. In general, fouling causes severe financial and industrial losses so it is necessary to reduce it. Fouling can be caused by organic (rigid and flexible biopolymers, fulvic and humic compounds) and inorganic (silica, minerals etc.) compounds. In order to find the appropriate solution for the fouling problem, the understanding of the foulant-foulant as well as foulant-surface interactions has to take place.

There are several factors that are causing fouling; the composition of feed (type of foulant used, pH, ionic strength, and concentration), hydrodynamic conditions (permeance, cross flow speed etc.) and membrane properties such as roughness, charge, functional groups and hydrophilicity. (Tang, C. Y.; Chong, T.; Fane, A. G., Colloidal interactions and fouling of NF and RO membranes: a review. *Advances in colloid and interface science* 2011, 164, (1), 126-143). Fouling takes place either due to the cake formation and/or pore blockage. The laws and regulations regarding the oil and gas effluent quality are becoming stricter therefore increasing the need for membranes with desirable separation without severe permeance loss as well as with high stability and durability.

In Australia, permitted oil and gas limit for offshore effluent is 30 ppm daily or 50 ppm instantaneous. (Neff, J. M., *Bioaccumulation in marine organisms: effect of contaminants from oil well produced water*. Elsevier: 2002). In People's Republic of China monthly maximum limit of oil and gas effluent is 10 ppm while chemical oxygen demand (COD) limit is 100 ppm. (Tellez, G. T.; Nirmalakhandan, N.; Gardea-Torresdey, J. L., Performance evaluation of an activated sludge system for removing petroleum hydrocarbons from oilfield produced water. *Advances in Environmental Research* 2002, 6, (4), 455-470).

According to the Convention for Protection of the Marine Environment of the North-East Atlantic (OSPAR), annual average limit of amount of dispersed oil in the produced water allowed to be discharged in the sea is 40 ppm. According to United States Environmental Protection Agency (USEPA), maximum daily limit for oil and gas effluent is 42 ppm while monthly limit is 29 ppm in average.

Based on World Health Organization, regarding the turbidity of the effluent, ideal turbidity when measured in NTU should be below 1 NTU or on average cases below 5 NTU.

According to European Standards, total hydrocarbons in the oil and gas effluent should be lower than 10 ppm while oil concentration should be less than 5 ppm.

SUMMARY

In general, embodiments of the present disclosure describe, among other things, methods of making cellulose/ionic liquid membranes, methods of filtering hydrocarbons from an aqueous mixture using cellulose/ionic liquid membranes, and filtering systems based on cellulose/ionic liquid membranes.

Accordingly, embodiments of the present disclosure further describe a method of making a cellulose/ionic liquid membrane comprising dissolving cellulose in an ionic liquid to form a solution, casting the solution onto a porous support, immersing the porous support in a water bath to induce phase inversion to form the cellulose/ionic liquid membrane, and drying the cellulose/ionic liquid membrane.

Embodiments of the present disclosure also describe a method of separating hydrocarbons in an aqueous mixture comprising exposing the aqueous mixture to a cellulose/ionic liquid membrane, wherein the aqueous mixture includes hydrocarbons, and removing the hydrocarbons from the aqueous mixture as the aqueous mixture flows through the cellulose/ionic liquid membrane, wherein the hydrocarbons do not flow through the cellulose/ionic liquid membrane.

Embodiments of the present disclosure further describe a filter system comprising a cellulose/ionic liquid membrane used as a filter to separate hydrocarbons from an aqueous mixture.

The details of one or more examples are set forth in the description below. Other features, objects, and advantages will be apparent from the description and from the claims.

BRIEF DESCRIPTION OF THE DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
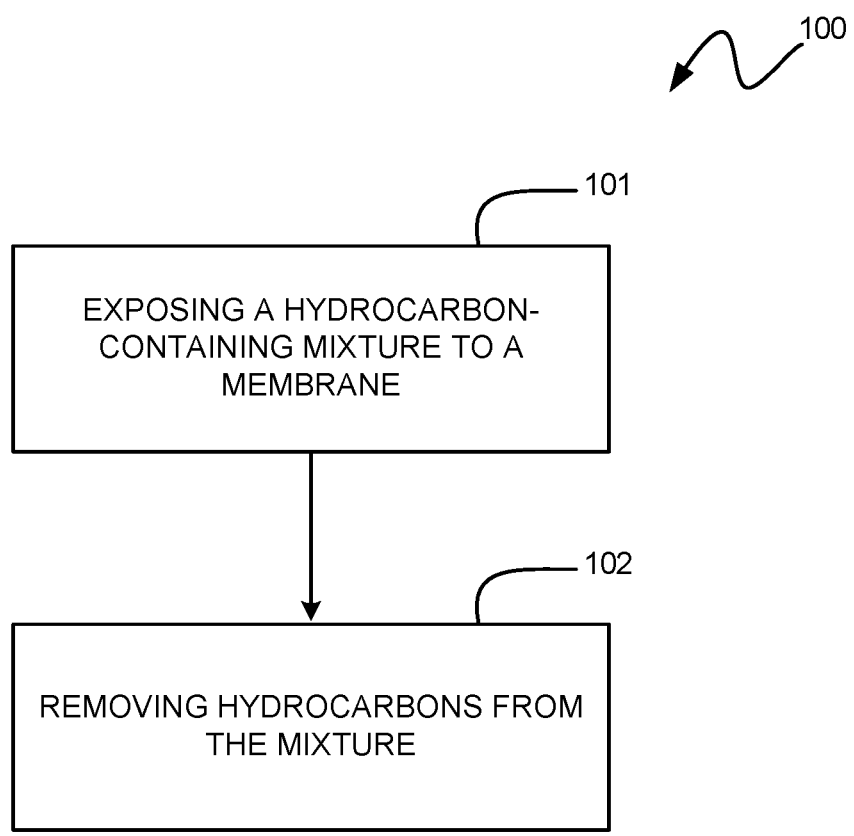
FIG. 1 is a flowchart of a method of separating hydrocarbons in a mixture, according to one or more embodiments of the present disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, material science, and the like, which are within the skill of the art.

The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise.

General Discussion

Embodiments of the present disclosure include cellulose/ionic liquid membranes, methods of filtering hydrocarbons from an aqueous mixture, and the like. Embodiments of the present disclosure can be advantageous in that the method of using the cellulose/ionic liquid membranes to filter hydrocarbons from an aqueous mixture to substantially or completely remove (e.g., separate) oil from oil-water emulsions, while maintaining high water permeability of about 150 $Lm^{-2}h^{-1}bar^{-1}$ (e.g., about 100 to 150 $Lm^{-2}h^{-1}bar^{-1}$), diminished fouling, and/or overall prolonged membrane stability and durability lifetime.

Cellulose used is one of the most renewable and natural polymers worldwide and its usage don't cause depletion of natural resources. Cellulose-based membranes are an attractive natural material due to its abundance, low cost, and natural hydrophilicity, where the natural hydrophilicity eliminates the need for complicated and expensive techniques for increasing hydrophilicity. Cellulose-based membranes are smooth, hydrophilic and negatively charged in wide range of pH, which is why they are a good anti fouling membranes. They are stable in acidic and basic conditions (pH 3-11) and are generally stable and durable. In addition, cellulose can also be recovered from the final product and/or after the useful life of the cellulose-based membrane.

Cellulose/ionic liquid membranes of the present disclosure are capable of near or complete (e.g., about 98-100%, about 99-100%, about 99.9 to 100%, or about 100%) separation of hydrocarbons (e.g., crude oil) from water in an oil-in-water emulsion. In addition, cellulose/ionic liquid membranes maintain a steady flux and have a high flux recovery, and these indicate that the cellulose/ionic liquid membranes are resistant to fouling under real conditions, can separate crude oil, and can recover its original flux without compromising the flux and the effluent quality. In this regard, cellulose/ionic liquid membranes can provide prolonged resistivity in oil-water separations since they need only mechanical cleaning, which reduces the operational and maintenance cost as well as provides longer membrane lifespan. Embodiments of the method have use in oil and gas industry where emulsified oil needs to be removed from water. Since the cellulose/ionic liquid membranes can completely remove the hydrocarbon, the method provides the ability to both provide concentrated oil and purified water.

FIG. 1 is a flowchart of a method 100 of separating hydrocarbons in a mixture, according to one or more embodiments of the present disclosure. At step 101, a hydrocarbon-containing mixture is exposed to (e.g., contacted with) a membrane. At step 102, hydrocarbons are removed (e.g., separated) from the mixture. In many embodiments, the mixture is an aqueous mixture and the membrane is a cellulose/ionic liquid membrane.

For example, an embodiment of the present disclosure includes a method of separating (e.g., filtering) hydrocarbons (e.g., petroleum such as crude oil and petroleum products such as gasoline) in an aqueous mixture. In an embodiment, the aqueous mixture can include floated or dispersed petroleum or emulsified petroleum. In an embodiment, the aqueous mixture can include petroleum waste water such as those produced in the oil and gas industry (e.g., oil wells and the like), food industry, chemical and petroleum industry.

In an embodiment, the aqueous mixture can be exposed to a cellulose/ionic liquid membrane. In an embodiment, the cellulose/ionic liquid membrane can be used in a filtering method or system or a separating method or system where water and a hydrocarbon are to be separated from one another. The cellulose/ionic liquid membrane removes (substantially remove (e.g., about 95% or more, about 98% or more, or about 99% or more) or completely remove (e.g., about 99.9% or more, or about 100%)) the hydrocarbons from the aqueous mixture as the aqueous mixtures flows through the cellulose/ionic liquid membrane, where the hydrocarbons do not flow through the cellulose/ionic liquid membrane. In an embodiment, the hydrocarbon is trapped on the surface of the cellulose/ionic liquid membrane and can be mechanically removed on a periodic basis.

In an embodiment, a surfactant can be added to the aqueous mixture to enhance the separation of the hydrocarbon from the water. In an embodiment, the surfactant can include sodium dodecylbenzenesulfonyl (SDBS), hexadecyltrimethylammonium bromide (CTAB), polysorbate 80 (Tween 80), sodium dodecyl sulfonyl, polysorbate 85 (Tween 85), other surfactants having the same or similar functional groups or a combination thereof.

The concentration of the surfactant is based on the ratio to the crude oil used. In an embodiment, the ratio can be about 1:10 (±20%) (oil:surfactant), which means if 200 mg/L of oil is used, 20 mg/L of surfactant. The concentration of surfactant used depends on the type of emulsion we wanted to achieve. To achieve emulsions with oil particle size less than 10 micrometers, the aforementioned ratio is to be used. If even smaller oil particle size e.g., nanosize wants to be achieved higher amount of surfactant can be used upon consideration of the thermodynamics of the system and the extra foaming might occur if too much surfactant is used.

In an embodiment, the cellulose/ionic liquid membrane used in the method has a pure water permeance of about 75 to 150 $Lm^{-2}h^{-1}bar^{-1}$ or 150 $Lm^{-2}h^{-1}bar^{-1}$ and a hydrocarbon-water permeance of about 50 to 100 $Lm^{-2}h^{-1}bar^{-1}$ or about 75 $Lm^{-2}h^{-1}bar^{-1}$ and recovered water permeance of about 60 to 120 $Lm^{-2}h^{-1}bar^{-1}$ or about 90 $Lm^{-2}h^{-1}bar^{-1}$ for the thinnest cellulose coating of about 1 to 3 wt. % or about 2 wt. %. In addition, the cellulose/ionic liquid membrane has a flux decay ratio of about 5 to 30% or about 10-20% and a flux recovery ratio of about 50 to 90 or up to about 90% for thicker cellulose coatings of about 4 to 6 or about 5 wt. %.

Figure 2:
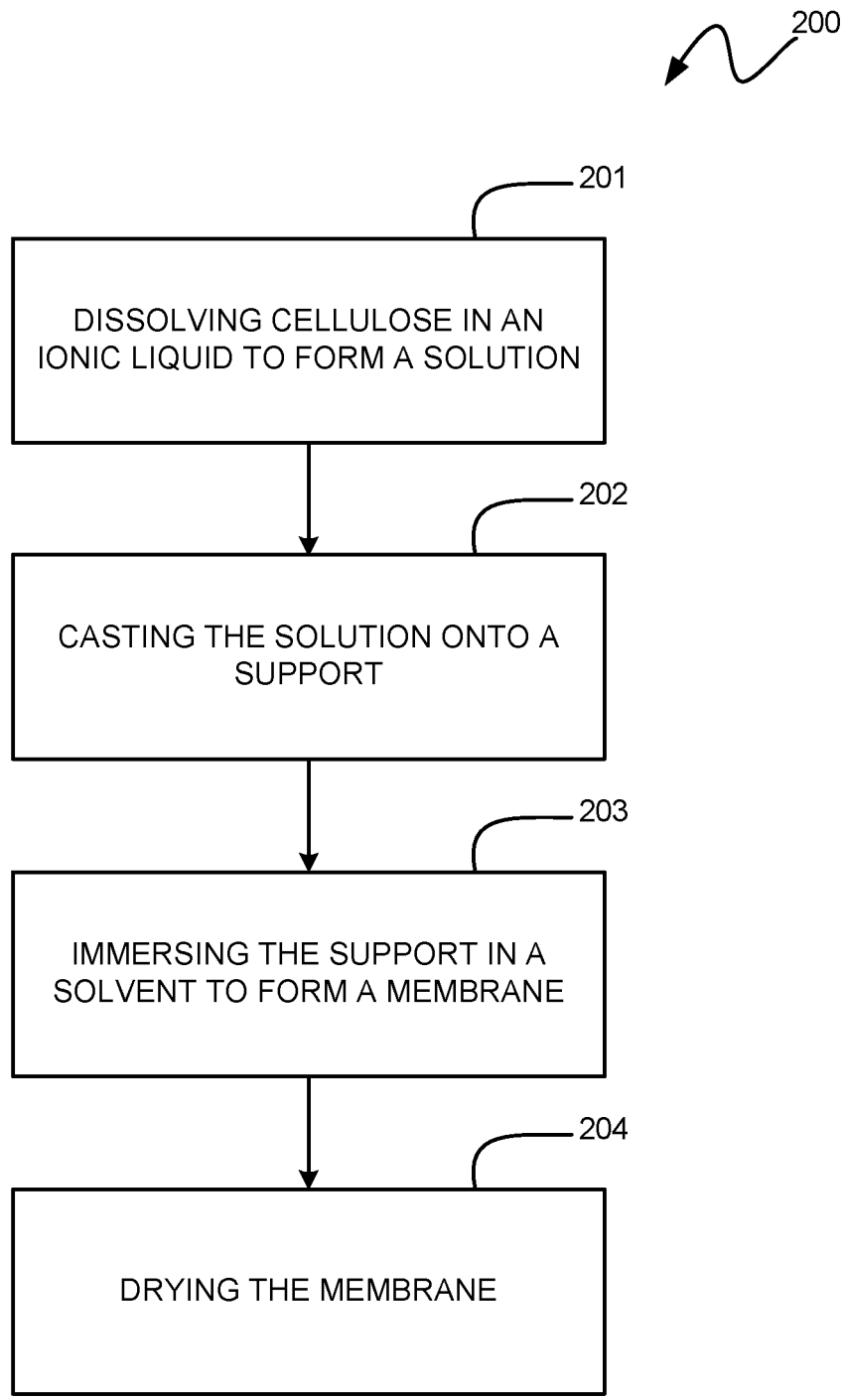
FIG. 2 is a flowchart of a method of making a membrane, according to one or more embodiments of the present disclosure.

FIG. 2 is a flowchart of a method of making a membrane, according to one or more embodiments of the present disclosure. At step, 201, cellulose is dissolved in an ionic liquid to form a solution. At step 202, the solution is cast onto a support (e.g., a porous support). At step 203, the support is immersed in a solvent (e.g., water bath) to form a membrane (e.g., cellulose/ionic liquid membrane formed via phase inversion). At step 204, the membrane is dried.

In an embodiment, a cellulose/ionic liquid membrane is prepared from a solution of cellulose in an ionic liquid solvent. In short, cellulose is dissolved in an ionic liquid to form a solution. The solution is cast onto a porous support and subsequently immersed in a water bath to induce phase inversion to form the cellulose/ionic liquid membrane. The cellulose/ionic liquid membrane is then dried. Additional details are provided in the Example.

In an embodiment, the ionic liquid solvent can include 1-ethyl-3-methyl imidazolium acetate, 1-ethyl-3-methylimidazolium diethyl phosphate, 1-ethyl-3-methylimidazolium chloride, 1-ethyl-3-methylimidazolium iodide with emphasis regarding the combination of anion and cation in such a way that strong cellulose hydrogen bonds can be broken which can be achieved with presence of hydrogen acceptor sites in the anion structure and lack of hydrogen bond donors in the ionic liquid cation. For example, this happens when the ionic liquid contains imidazolium as the cation and an acetate as anion. In a particular embodiment, the ionic liquid is 1-ethyl-3-methyl imidazolium since it is advantageous because it has low toxicity and low viscosity and it doesn't evaporate which makes it more environmentally friendly both for the process operators and since it can be recovered, it presents less negative environmental impact and reduce waste.

Use of a cellulose/ionic liquid membrane includes the extremely high hydrophilicity which is a "go to" recipe when you want to achieve high permeability and have an acceptable anti fouling property. The preparation of such a cellulose/ionic liquid membrane is simple and less expensive than other methods for preparing hydrophilic surfaces. Other membranes are difficult to prepare and are expensive to prepare. Embodiments of the present disclosure offer a one-step process for cellulose dissolution in ionic liquid that is a fast process capable of replacing extensive cellulose dissolutions processes. The natural abundance of cellulose is attractive and the high amount of OH groups contributes to hydrophilicity, which provides high permeability and good fouling resistance.

An advantage of embodiments of the cellulose/ionic liquid is that the oil-water separation of 100% can be achieved. In addition, the cellulose/ionic liquid membranes can exhibit high permeances in both water and hydrocarbon emulsions and that the water recovery is more than 90%, which together with the fact that membrane is fouling resistant, visible from the look of the membrane, illustrates that the cellulose/ionic liquid membrane is appropriate for oil-water separation. In addition, the ionic liquid and the cellulose material can be recovered and recycled.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

Example 1

This Example is directed towards antifouling property of cellulose thin film composite membranes. Cellulose membranes, prepared from natural biopolymer cellulose and dissolved in environmentally more acceptable acetic ionic liquid, due to its hydrophilicity and abundance of OH groups, which together with smooth surface and predominantly negative charge in wider range of pH, makes cellulose membrane a good candidate for fouling related issues with oil-water emulsion as foulant.

An oil-water emulsion was prepared from crude oil to test the crude oil concentration in oil-water emulsion. The composition of oil-water emulsion was varied, trying to mimic the real produced water and to examine the stability and resistivity of the membranes. Increasing the crude oil concentration from 200 ppm to 1000 ppm, changing the pH from acid to neutral and basic, interchanging anionic, nonionic and cationic surfactants, as well as salt addition all yielded 0 ppm of crude oil in the permeates and less than 1 NTU turbidity for 96% of the permeates. The stability test revealed membranes with regard to oil-water emulsion show great endurance, stability, and durability.

The extent of fouling measurement was performed to test the membrane stability, permeance reduction, and overall fouling resistivity.

EXPERIMENTAL

Material.
Avicel® PH-101 microcrystalline cellulose (MW=160,000-560,000 $gmol^{-1}$) was purchased from Fluka Analytical, latter produced by Wacker Chemie AG, Burghausen, Germany, used as received. Hydrochloride acid (HCl, 36.5-38.0%) and sodium chloride (99%) were purchased from Alfa Aesar®. Sodium hydroxide (NaOH, ≥99%) was purchased from Sigma Aldrich® and used as received. Ionic liquid 1-ethyl-3-methylimidazolium acetate (≥90%) was purchased from Sigma Aldrich®, produced by BASF. Milli-Q® water (Millipore) with specific resistivity 18.2 MΩ cm at 26.1° C. was used for membrane preparation and testing.

The asymmetric porous support based on polysulfone (PSU) was prepared at KAUST by phase inversion using continuously operating machine. The polyester wet-laid nonwoven fabric, type 05TH-100 approximately 161 μm thick used for the preparation of cellulose/ionic liquid membranes was purchased from Hirose Paper, Japan. Crude oil was kindly provided from petrochemical partner. Surfactants sodium dodecylbenzenesolfonate ($CH_3(CH_2)_{11}C_6H_4SO_3Na$), hexadecyltrimethylammonium bromide ($N(CH_3)_3Br$)) and polysorbate 80 (Tween® 80) was purchased from Sigma Aldrich and used as received.

Preparation of Cellulose Multilayer Membrane.

Unmodified cellulose was dissolved in ionic liquid at 60° C. constantly stirring for 6-24 hours depending on the concentration used, 2 wt %, 5 wt. % and 10 wt. %. Solution was then casted onto polysulfone porous support backed up with nonwoven fabric with the casting rod having 150 μm thicknesses. Membranes were immediately immersed in water bath to induce phase inversion for approximately 2-4 hours and air-dried.

Preparation of Oil-Water Emulsion.

Crude oil of 200, 500 and 1000 ppm concentration was mixed with 80 g/L of sodium chloride, three different surfactants, anionic (SDBS), cationic (CTAB) and neutral (Tween 80)® and 1 L of MilliQ water in a laboratory blender several times for maximum time of 180 seconds at >20,000 rpm. The mixing was repeated until emulsion was reached and no had no visually obvious particles were noticed. The three surfactants were added in 1:10 ratio (surfactant:oil).

Characterization of Cellulose Membranes

Removal of Oil from Oil-Water Emulsions.

For oil-in-water separation experiment dead end filtration set up was used. Membranes (14.6 cm active area) were placed in stainless steel cell and connected with tubing to the nitrogen gas cylinder while 5 bar pressure was used for all experiments unless otherwise stated. The permeate was collected in a beaker and analyzed immediately. Stirrer was used inside the stainless steel cells with produced water, mixing the solution continuously during all experiments at 300 rpm.

Extent of Fouling for Oil-in-Water Experiment.

Figure 3:
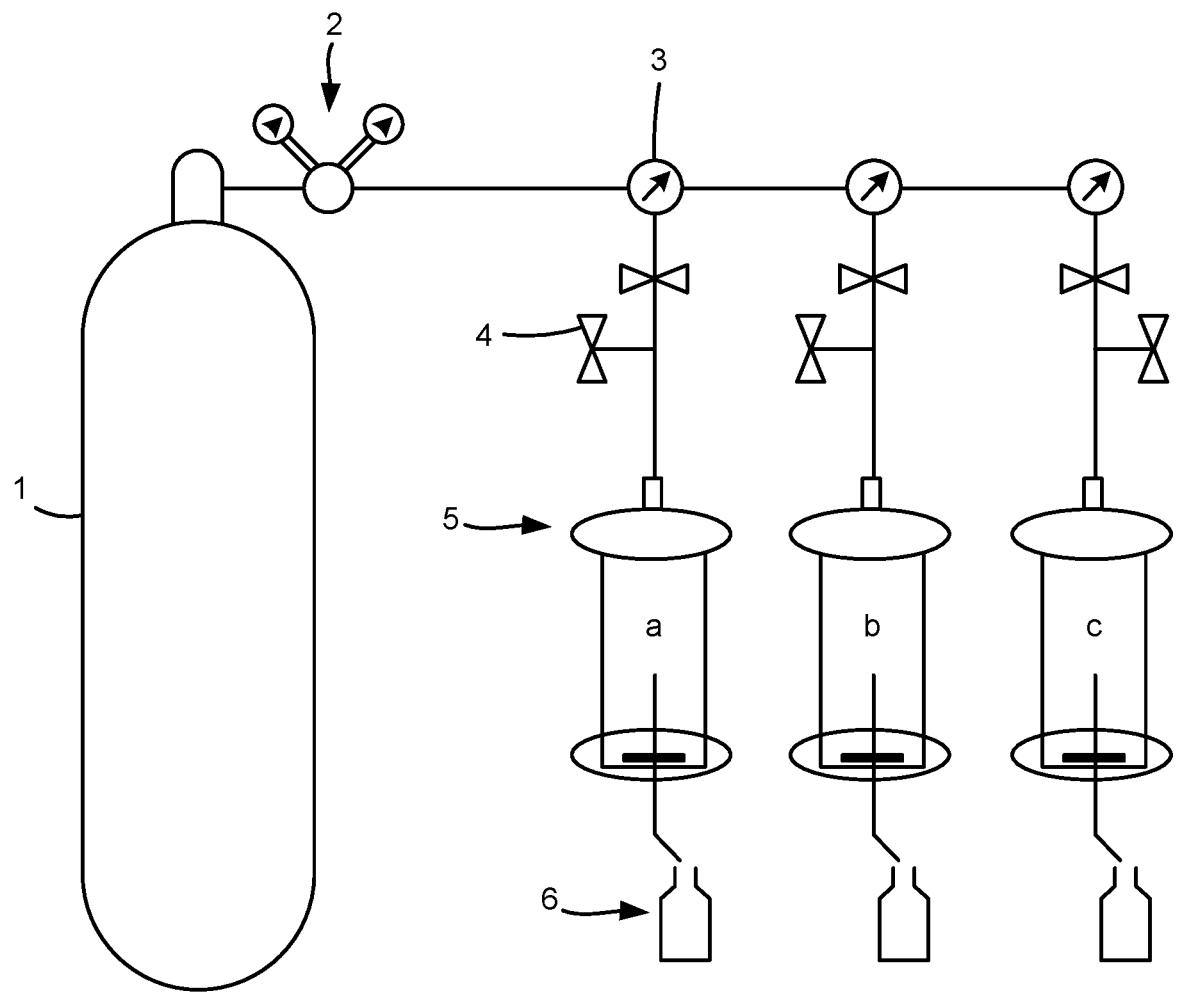
FIG. 3 is a schematic diagram of an experimental design to determine the extent of fouling for oil-water emulsions, according to one or more embodiments of the present disclosure.

In order to investigate the resistivity of cellulose membrane towards oil-water emulsion, the rate of oil separation and the stability of membrane following experiment was conducted. Membranes that were previously kept in water were first filtered with pure water until stable permeance was achieved followed by first measurement of water permeance. Second, filtration of oil-water emulsion was conducted. The difference in permeance between the pure water and the emulsion gives us the information on permeance decline. Stainless steel cell was filled with 300 mL of oil-water emulsion, emulsion was filtered until stability was achieved and minimum 100 mL was collected as the permeate whilst the remaining emulsion in the cell was collected as retentate. Without removing the membrane, cell was rinsed with water, refilled with pure water and the pure water flux was measured again in order to measure the recovery ratio (FIG. 3). Finally, oil-water emulsion permeance was measured in the beginning and in the end in order to follow the flux decline trend of the emulsion. To observe any visible adsorption membrane was taken out from the cell, rinsed with water and no noticeable change of color was observed. Feed, permeate and retentate were analyzed immediately after finalizing the experiment.

For each experiment, membranes with 2 wt. %, 5 wt. % and 10 wt. % of cellulose dissolved in ionic liquid were used with three different surfactants at 3 different pH value of neutral, acid and basic, respectively.

pH Adjustment.

The pH adjustment of 4 and 11 for the produced water solutions was done with 1 M HCl and 0.1 M NaOH. The adjustment was done using the Whatman pH indicator sticks.

Turbidity.

Turbidity was measured using the 2100Q HACH portable turbidimeter that measures turbidity in NTU units of produced water feeds and permeates. The device is compliant with USEPA Method 180.1. design criteria.

Total Oil and Grease and Oil in Water Analysis.

To measure the oil concentration (ppm) in the feed and the permeate, gravimetric and spectrophotometric analysis had been obtained.

The HD 1000 handheld analyzer for oil in water measurement is a handheld analyzer with a probe that gives spectral analysis and laser induced fluorescence in real time measurement to obtain oil concentration from water.

Determination of oil in water was also measured gravimetrically by using the total oil and grease method that uses solvent tetrachloroethylene to extract oil from water and measures the oil content spectrophotometrically. Both methods were used to verify the separation of oil from water.

Streaming Potential.

Streaming potential, zeta potential and particle size was obtained using Malvern Zetasizer Nano ZS that incorporates dynamic light scattering, electrophoresis and static light scattering. The sample of 0.5 $mm^2$ was placed on a membrane holder which was inserted in the instrument. Various pH ranging from 3-11 were examined with each measurement taking up to 30 minutes. The pH was adjusted manually each time. Besides the streaming potential of the membranes, zeta potential of the feeds itself was measured with the same instrument.

Results and Discussion

Oil in water separation was carried out under constant pressure of 5 bar with interchanging matrix of effect of concentration, pH and surfactants.

For the purpose of extracting crude oil from oil reservoir water is injected into the well in order to increase the reservoir pressure and drive the crude oil up to the from where it can pumped. This usually occurs in secondary and tertiary recovery. The method where water is used to pump out the oil is often referred to as the water flooding.

Water injection provides additional pressure in the reservoir stimulating oil production and it pushes it towards the well. The water used for flooding is commonly reused as "produced water". Since it is solely not sufficient, other sources of so called "make-up" water are used, which can be seawater, aquifer water and river water.

Produced water is frequently contaminated with various hydrocarbons, metals and salts, depending on their origin. Water injected in the well is most likely quite salty, giving that seawater is the most abundant choice especially for offshore refineries.

Salt concentration in produced water can be from several ppm to 300,000 ppm. Salt exacerbates scaling and corrosion, causing problems in process equipment and piping. Presence of salt is practically inevitable in oil and gas industry. Sodium chloride was added in our tests with a concentration of 80 g/L to mimic real produced water conditions and to prepare solution that should promote more severe fouling to evaluate the performance of cellulose layer. Introduction of salt decreases the critical micelle concentration and also the partitioning of the surfactant between the two phases (oil/ water). Salt can compress the electric double layer around particles or oil droplets in emulsions or on membrane surfaces.

Fouling can be classified as reversible and irreversible, backwashable and non-backwashable. Reversible fouling is due to partial pore blockage and cake filtration, whilst irreversible fouling is due to the internal pore blockage and adsorption of foulants onto the membrane surface. Non-backwashable fouling cannot be removed with hydraulic backwash but it can be removed by chemical cleaning. On the other hand, irreversible fouling cannot be removed with chemical cleaning or any other method (backwash, flushing, wiping) and membrane will not recover its original permeability.

To assess the extent of fouling of cellulose membranes towards oil in water emulsions, the flux recovery ratio and the total flux loss or flux decay were calculated.

The flux recovery ratio represents the amount of pure water permeance that can be recovered after testing the membrane with oil in water emulsion. The flux decay ratio is the ratio between the pure water permeance and that of the emulsion, tested with the same membrane. Several factors affect the extent of fouling. Charge characteristic is an important one. Foulant-foulant and membrane-foulant electrostatic and hydrophobic interactions are the main reason for adsorption or lack of that. Besides fouling, concentration polarization can be a reason for the flux decline.

Figure 4:
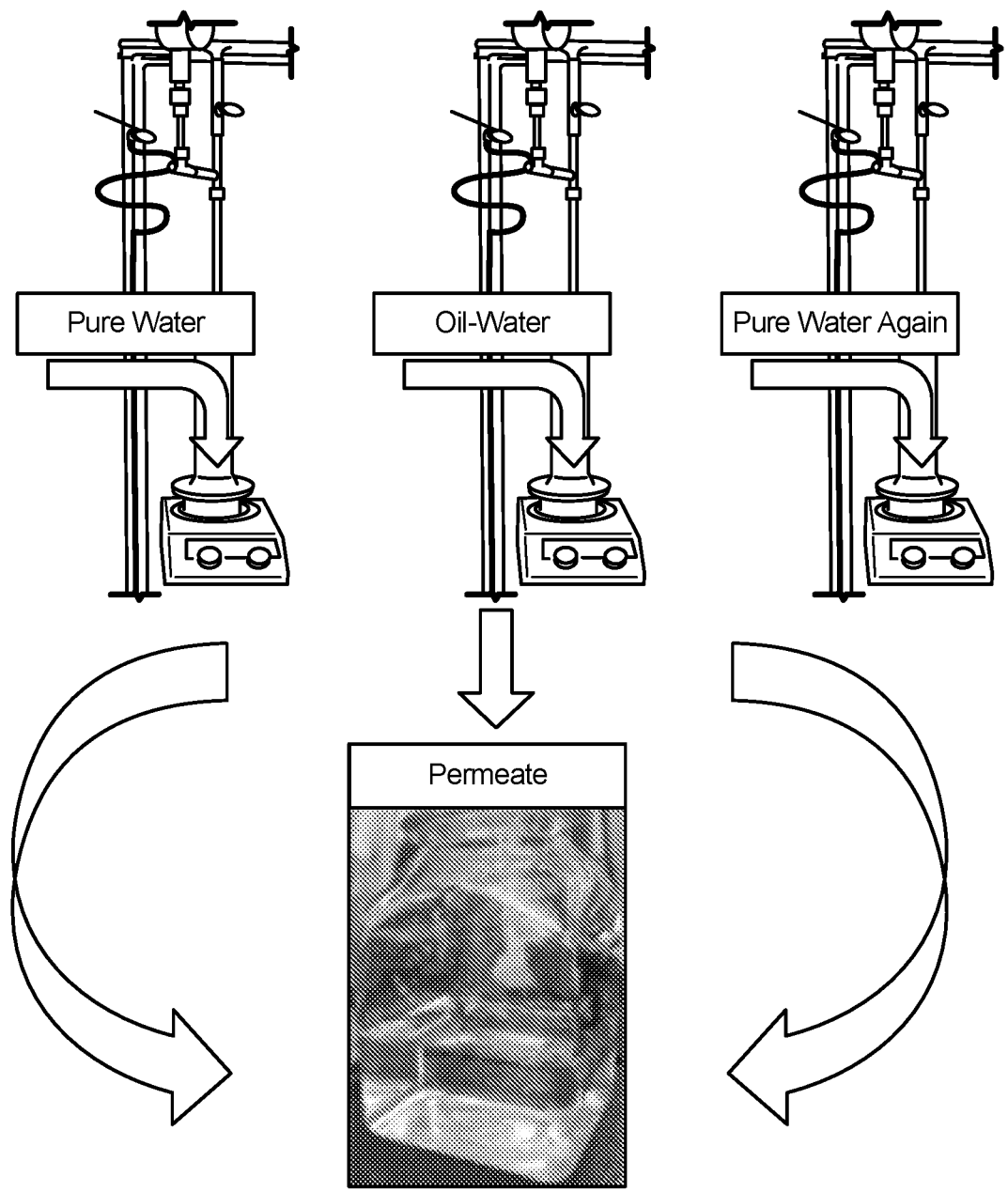
FIG. 4 is a schematic diagram of the experiments relating to investigating the effect of concentration, pH, and surfactants on oil removal, according to one or more embodiments of the present disclosure.

Oil-water separation was carried out under constant pressure of 5 bars, investigating the effect of concentration, pH and surfactants on the oil removal when compared to the control polysulfone membranes. FIG. 4 is a schematic illustration of the experiments is presented. Membranes were placed in stainless steel cell connected to the nitrogen gas cylinder under constant stirring. Firstly, pure water permeation was measured, followed by oil in water emulsion permeation. Finally pure water permeation was measured again. Between the measurements, the membranes were not removed; they were simply rinsed with water.

Surfactants are widely used in the petroleum industry due to their ability to decrease the interfacial tension between water and oil, stabilizing emulsions and facilitating water intrusion in rock capillary pores. In order to prepare an emulsion where the size of oil droplets is less than 10 μm, the addition of surfactant is crucial. Surfactants are amphiphilic compounds constituted by a hydrophilic (water soluble) head and a hydrophobic (oil soluble) tail.

Three different surfactants were used, anionic sodium dodecylbenzylsulfonate (SDBS), cationic hexadecyltrimethylammonium bromide (CTAB) and neutral Polysorbate® 80 (Tween® 80).

a)

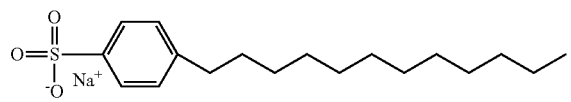

b)

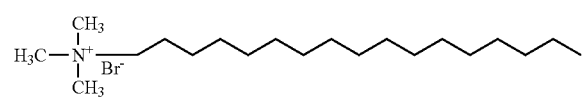 [SMILES: CCCCCCCCCCCCCCCCC[N+](C)(C)C ; [Br-]]

c)

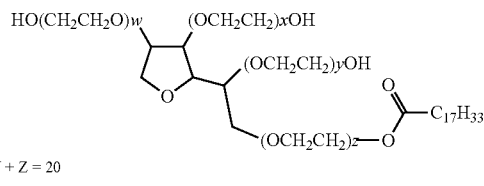

X + Y + Z = 20

As shown above, three surfactants used in the experiment: a) sodium dodecylbenzenesulfonyl (SDBS), b) hexadecyltrimethylammonium bromide (CTAB), and c) Polysorbate 80 (Tween 80).

The anionic surfactant contained an anionic benzenesulfonate group as head. The cationic one contained quaternary ammonium and the neutral surfactant does not have a charged group.

Particle size analysis revealed that the oil in water emulsion stabilized by the anionic surfactant has droplets with size in a range of 1-2 μm, while those stabilized by cationic and non-ionic surfactants have droplets with size in range of 200-300 nm and 200 nm, respectively.

Droplet sizes and the average zeta potential of 200 ppm oil in water emulsions containing different surfactants at pH 4, 8 and 11 are shown in Table 1-3.

TABLE 1

Droplet size and zeta potential of 200 ppm oil in water emulsion with SDBS at pH 4, 8 and 11.

|  | 200 SDBS pH 4 | 200 SDBS pH 8 | 200 SDBS pH 11 |
| --- | --- | --- | --- |
| Droplet size/nm | 2425 ± 759.0 | 1619 ± 76 | 759 ± 136 |
| Zeta potential/mV | −34 ± 9 | −36 ± 4 | −62 ± 2 |

TABLE 2

Droplet size and zeta potential of 200 ppm oil in water emulsion with CTAB at pH 4, 8 and 11.

|  | 200 CTAB pH 4 | 200 CTAB pH 8 | 200 CTAB pH 11 |
| --- | --- | --- | --- |
| Droplet size/nm | 218 ± 6 | 315 ± 72 | 231 ± 12 |
| Zeta potential/mV | 12.1 ± 0.3 | −2 ± 1 | −12 ± 4 |

TABLE 3

Droplet size and zeta potential of 200 ppm oil in water emulsion with Tween 80 at pH 4, 8 and 11.

|  | 200 TWEEN pH 4 | 200 TWEEN pH 8 | 200 TWEEN pH 11 |
| --- | --- | --- | --- |
| Droplet size/nm | 210 ± 3 | 227 ± 11 | 214 ± 5 |
| Zeta potential/mV | −4.3 ± 0.2 | −4.7 ± 0.6 | −2 ± 1 |

The larger droplet sizes detected with anionic surfactant reflect higher interface tension and a less stable emulsion, when compared to the other two surfactants. Oil-water emulsion emulsions containing anionic surfactant were the least stable ones, having oil visually separated from water within 3 days of preparation. Emulsions containing cationic surfactant were stable for 7 days, while emulsions containing non-ionic surfactant were stable for several weeks.

To investigate the stability of cellulose membrane in a broad range of pH, the prepared oil-water emulsion emulsions were characterized in at pH 4, 8 and 11.

The change of pH might affect the membrane and the emulsion itself. Membrane functional groups might protonate and deprotonate over wide pH range, and so will the surfactant molecules in the emulsion, leading to different charge density values. Charge of the membrane and charge of the ions in the solution will cause either electrostatic repulsion or attraction, which will directly affect the performance of the membrane.

Figure 5A:
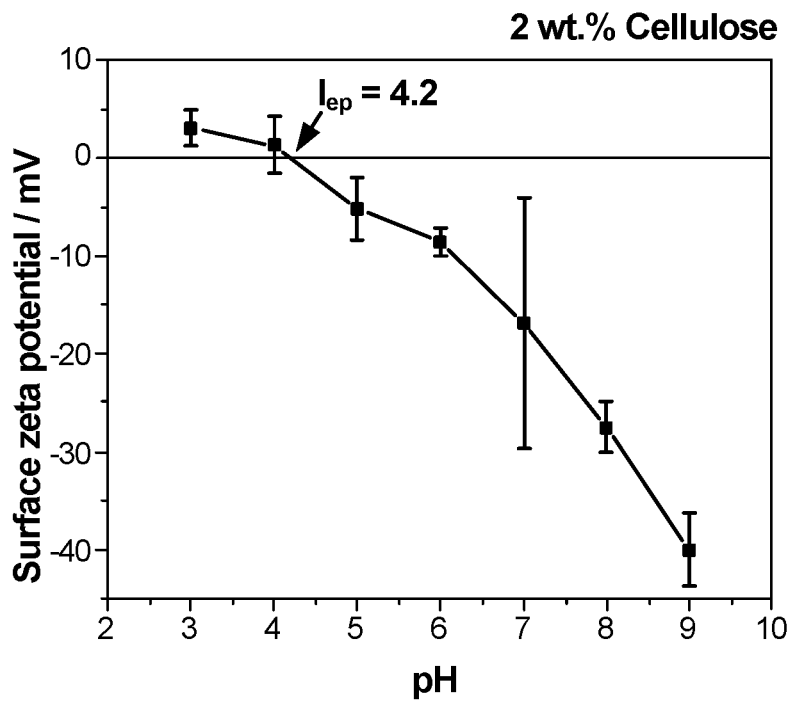
FIG. 5A-5B are graphical views of (a) zeta potential of a membrane prepared from 2 wt % cellulose solution measured with water at different pH values and (b) zeta potential of surfactant-oil droplets in water for an emulsion containing 200 ppm crude oil and 20 ppm SDBS, CTAB, and Tween, according to one or more embodiments of the present disclosure.
Figure 5B:
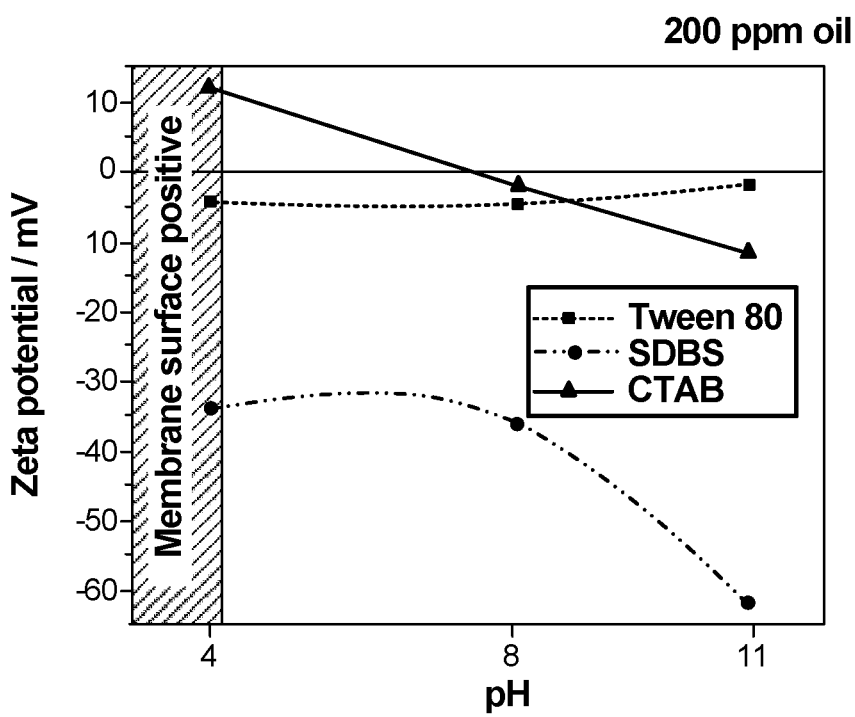

The zeta potential of a membrane prepared from a 2 wt. % cellulose solution and the zeta potential of surfactant-oil droplets in an emulsion containing 200 ppm crude oil and three surfactants are shown in FIGS. 5A and 5B.

When a charged particle or droplet is suspended in liquid, ions of opposite charge will be attracted to its surface. Cellulose membrane, having negative charge at high pH will attract positive ions to bind to its surface. The first layer of ions close to the surface of the membrane will be strongly bound (Stern layer) to it and ions that are further away will be more loosely bounded, forming what is called a diffuse layer.

Figure 6:
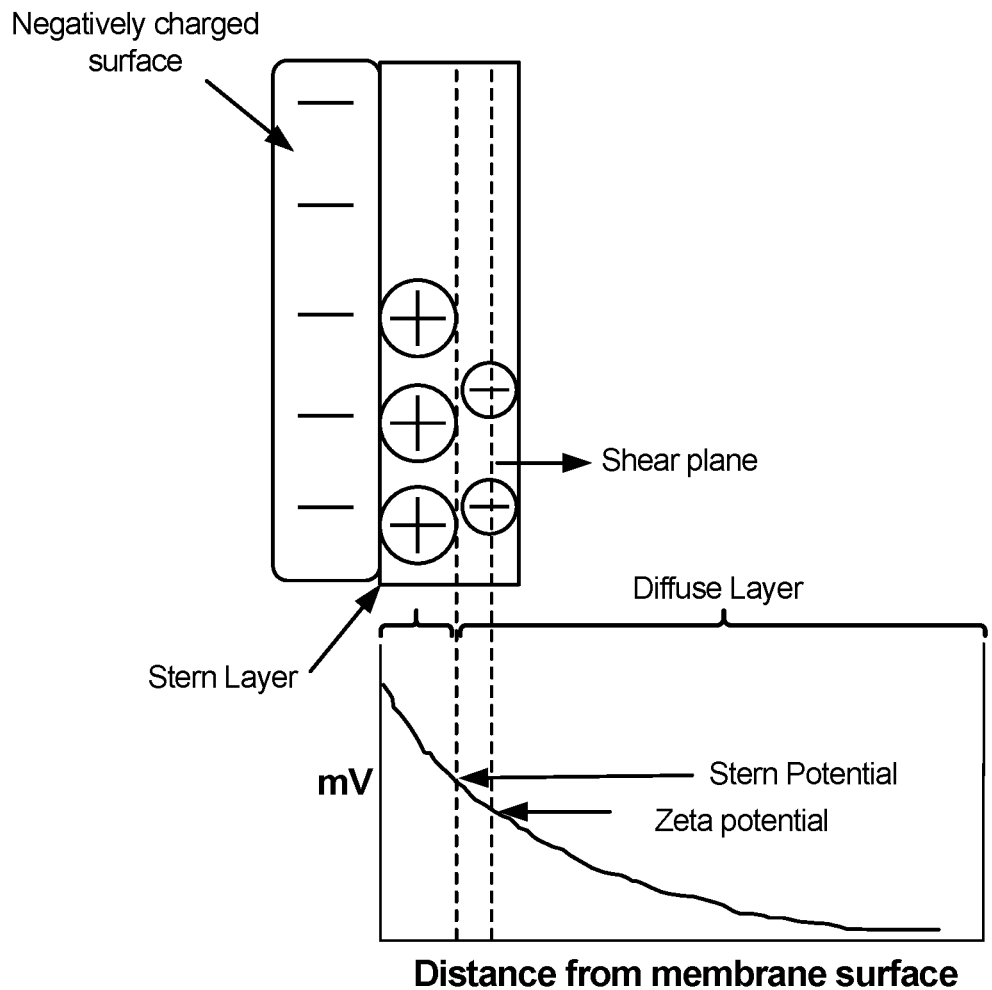
FIG. 6 is a schematic diagram of the membrane-aqueous mixture interface, according to one or more embodiments of the present disclosure.

The layer of counter-ions next to the Stern layer is still relatively strongly bounded to the surface constituting the outer Helmholtz layer. If the surface is moved, this ion layer would move with it and in a practical measurement, the zeta potential corresponds to the potential at this layer (FIG. 6). Changes in pH will change how strongly the ions and counter ions will be bounded to the surface, affecting the zeta potential.

Similarly, the zeta potential of the surfactant-oil droplets depends on pH too. Low pH, favor a positive (or less negative) zeta potential; high pH favors a more negative zeta potential (FIGS. 5A-5B).

Figure 7:
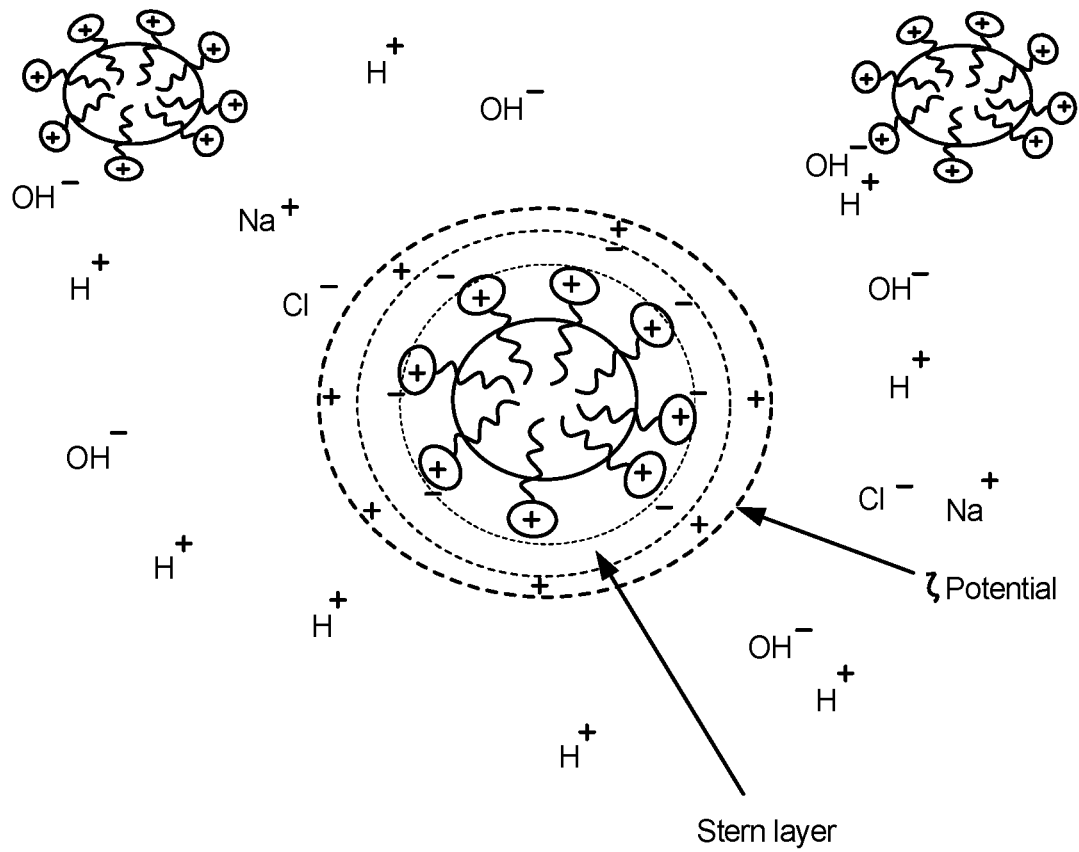
FIG. 7 is a schematic diagram of a CTAB-oil droplet at low pH, according to one or more embodiments of the present disclosure.
Figure 8:
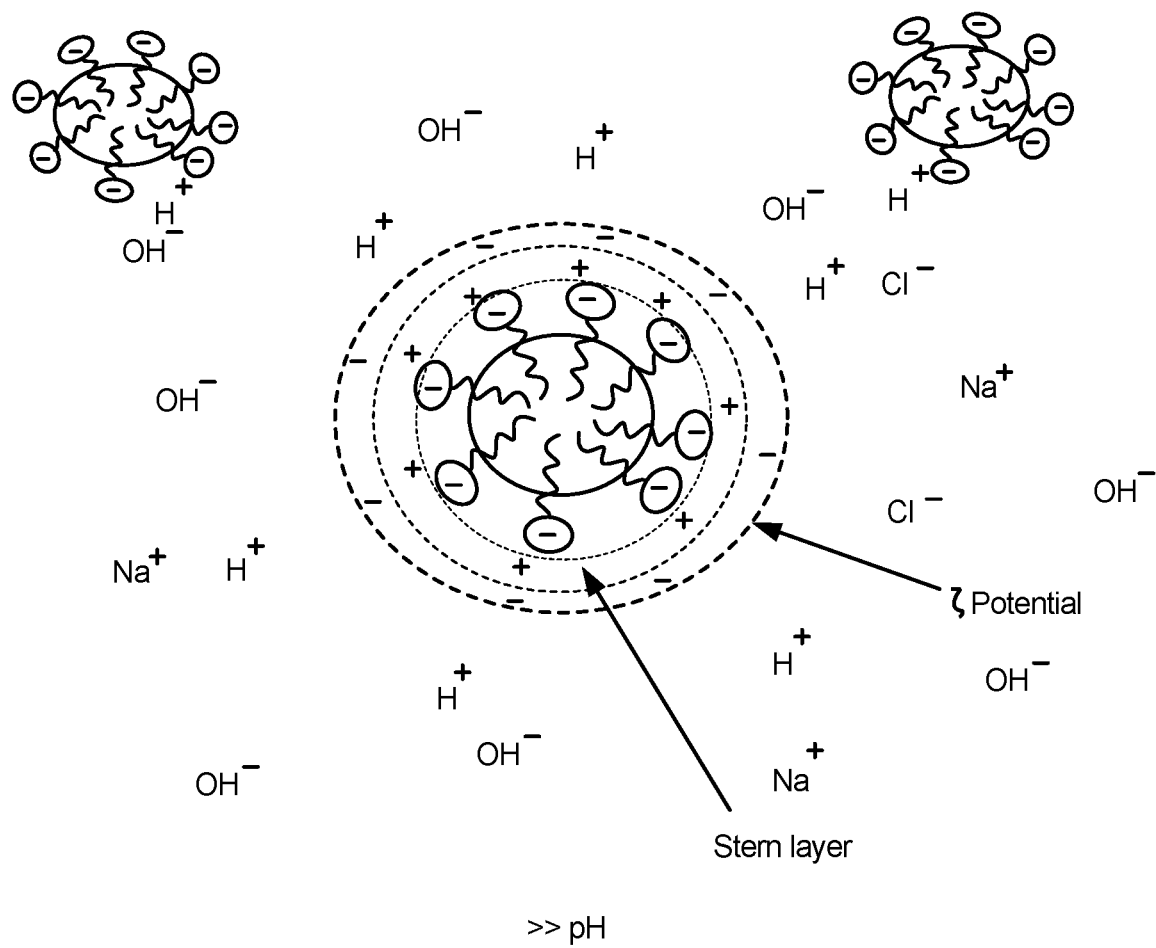
FIG. 8 is a schematic diagram of a SDBS-oil droplet at high pH, according to one or more embodiments of the present disclosure.

The surfactant molecules place themselves in the interface between the oil droplets and the water, with the hydrophobic tail penetrating the oil phase while the water soluble head remains in the contact with the water phase. A positively charged head attracts negative counter ions from the water phase, which then attract positive ions, determining the zeta potential (FIG. 7). Similarly, negatively charged water soluble head of anionic surfactant will attract positive counter ions from the aqueous phase, which then attract negative counterions, leading to a negative zeta potential, as depicted for SDBS-oil droplets in FIG. 8.

At low pH, positively charged CTAB-oil droplets would be repelled by the positively charged membrane. The membrane becomes negative above pH 4.2. SDBS-oil droplets are negative in the whole investigated pH range and should be more effectively repelled as the pH is increased above 4.2. Droplets in emulsions containing non-ionic surfactants have zeta potential not far from zero (slightly negative) in the whole pH range.

Figure 9:
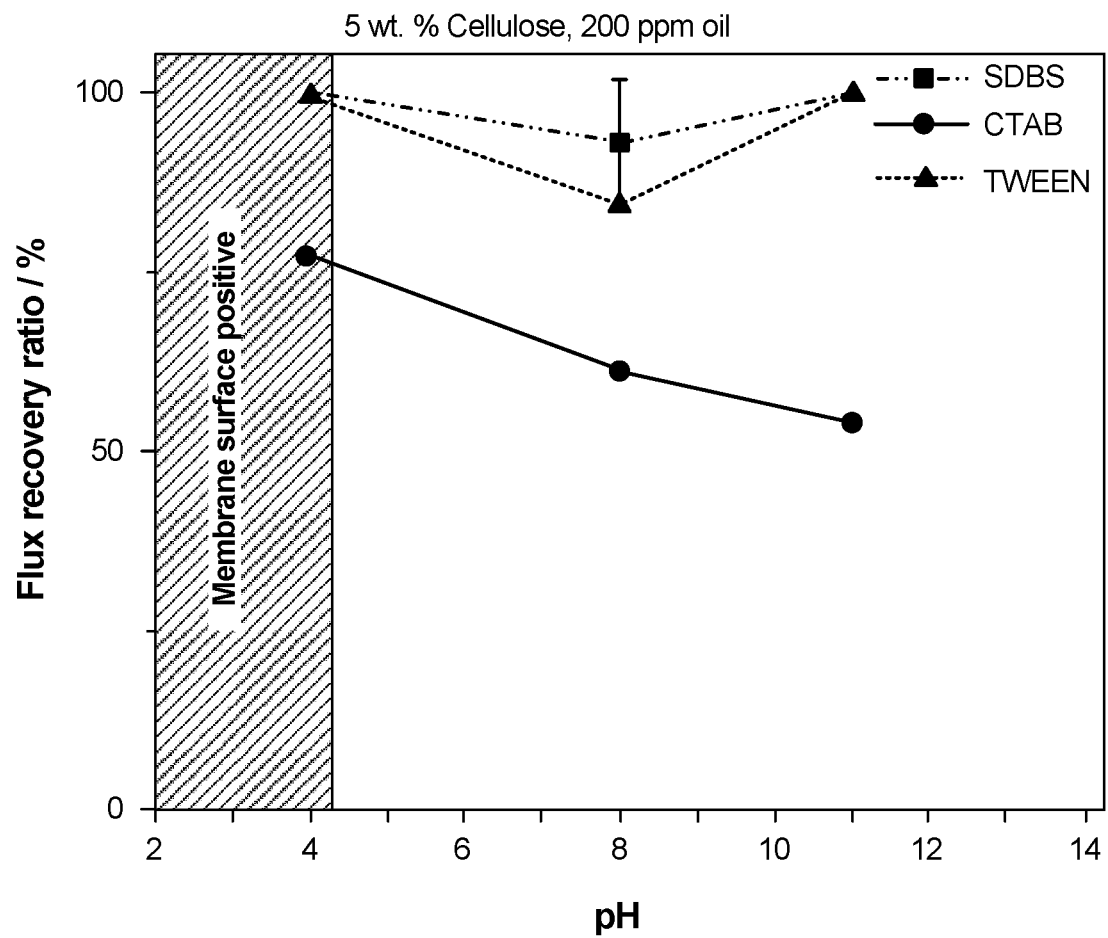
FIG. 9 is a graphical view of flux recovery ration for filtration of emulsions with SDBS, CTAB, and Tween through 5 wt % cellulose membrane, according to one or more embodiments of the present disclosure.

Membranes prepared from 2, 5 and 10 wt % cellulose solutions were investigated using oil in water emulsions with 200, 500 and 1000 ppm oil at pH values 4, 8 and 11. Representative results are chosen here. The performance of 5 wt % cellulose membrane is shown in terms of flux recovery in FIG. 9. Low flux recovery indicates higher adsorption onto the membrane surface and therefore more irreversible fouling. Filtration of emulsions containing anionic surfactant had the highest flux recovery, similar to those with non-ionic surfactant, whilst emulsions containing cationic surfactant had the least flux recovery.

The effect of different surfactant and oil concentration on permeance is shown in FIGS. 10A-10C and FIGS. 11A-11F.

Figure 10A:
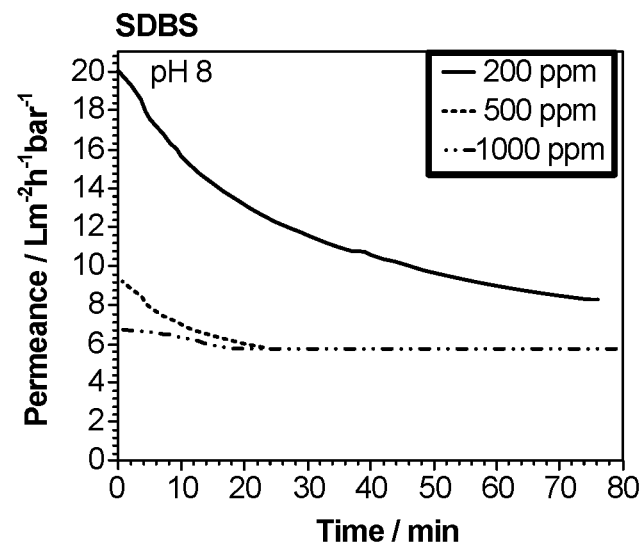
FIGS. 10A-10C are graphical views of emulsion permeance through 5 wt % cellulose membranes containing SDBS, CTAB, and Tween and 200, 500, and 1000 ppm of crude oil at pH 8, respectively, according to one or more embodiments of the present disclosure.
Figure 10B:
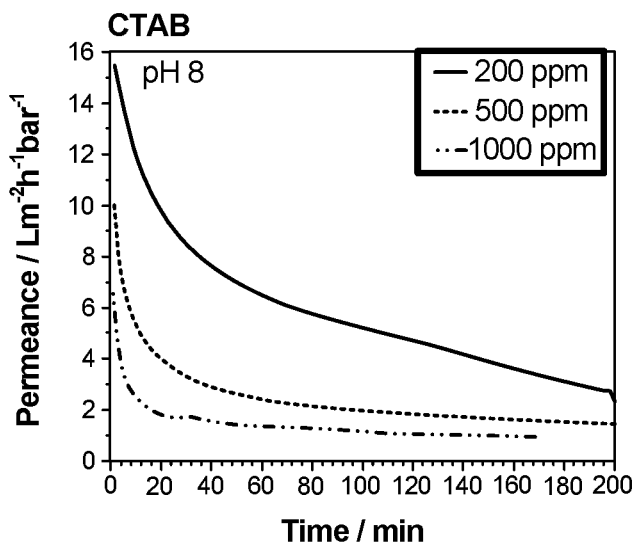
Figure 10C:
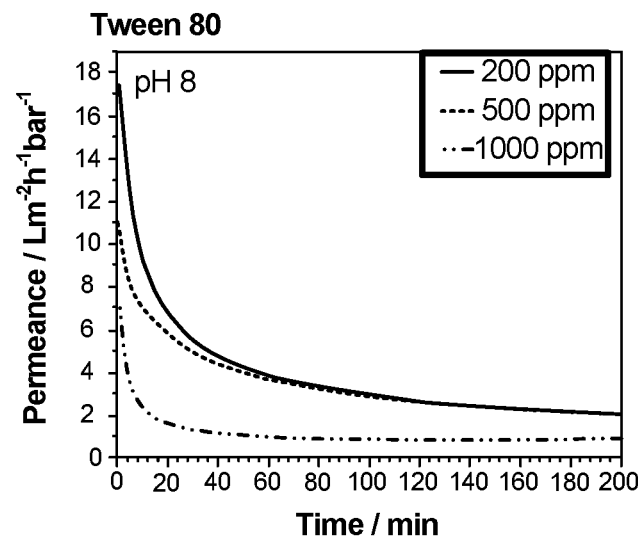
Figure 11A:
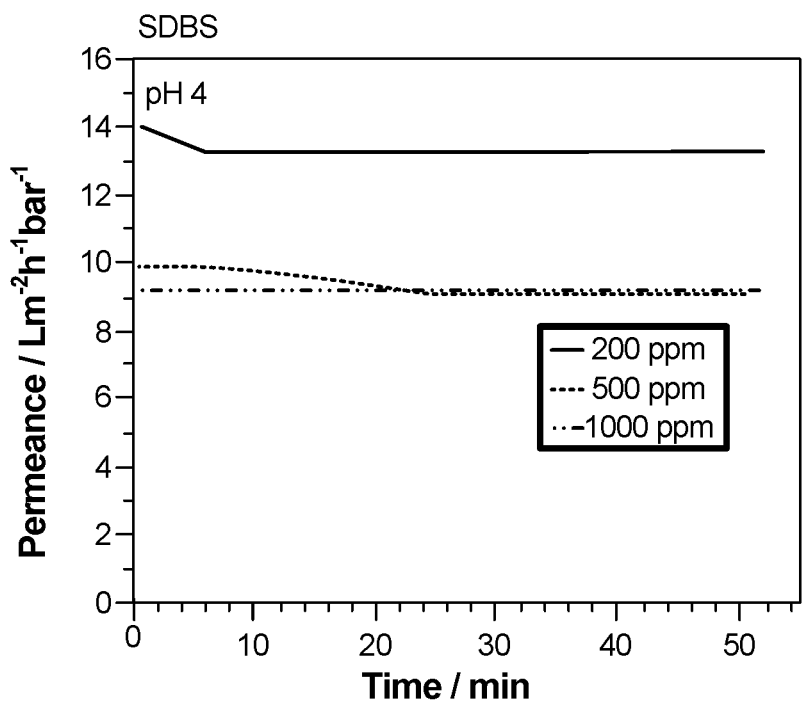
FIGS. 11A-11F are graphical views of emulsion permeance through 5 wt % cellulose membrane containing SDBS, CTAB, and Tween and 200, 500, and 1000 ppm of crude oil at pH 4 and pH 11, respectively, according to one or more embodiments of the present disclosure.
Figure 11B:
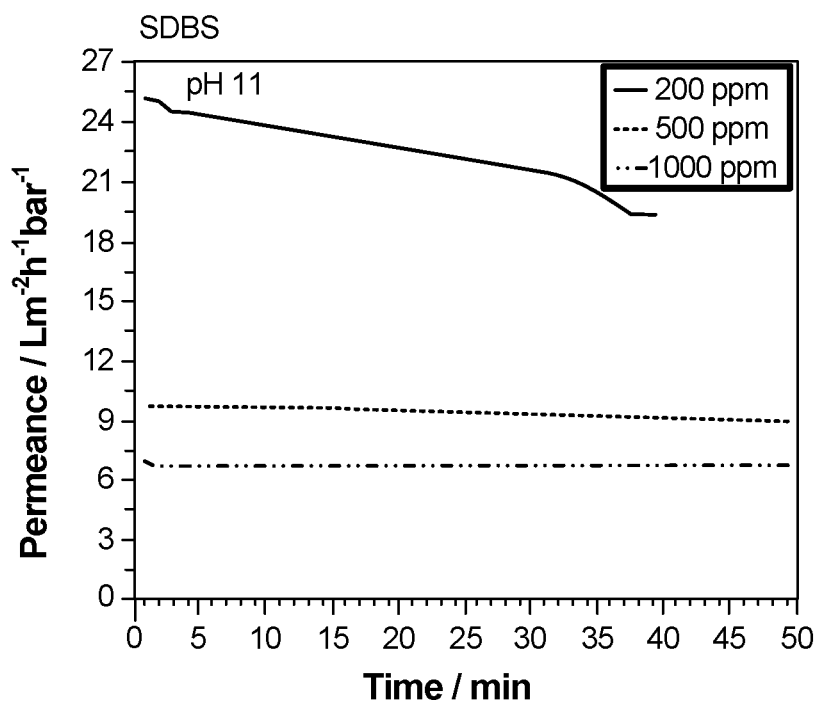
Figure 11C:
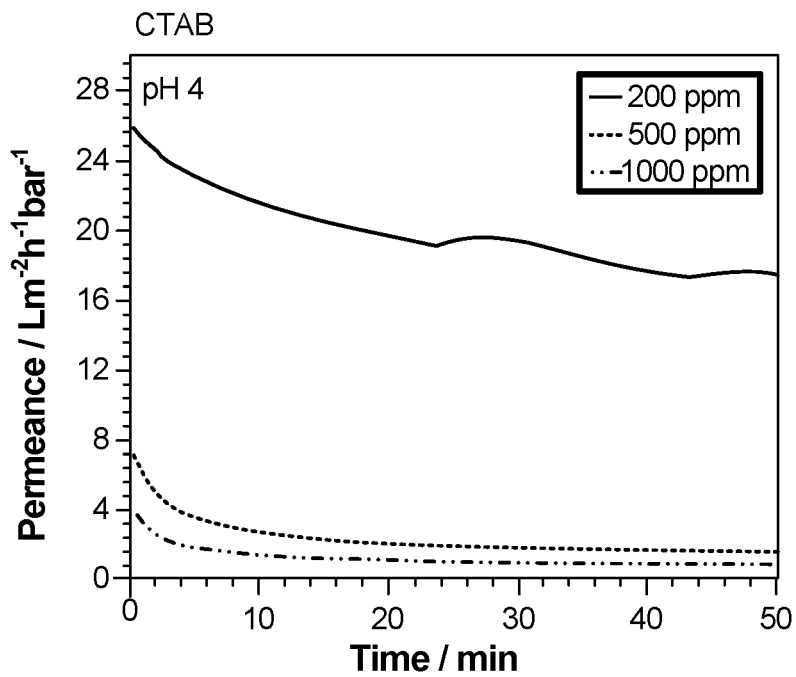
Figure 11D:
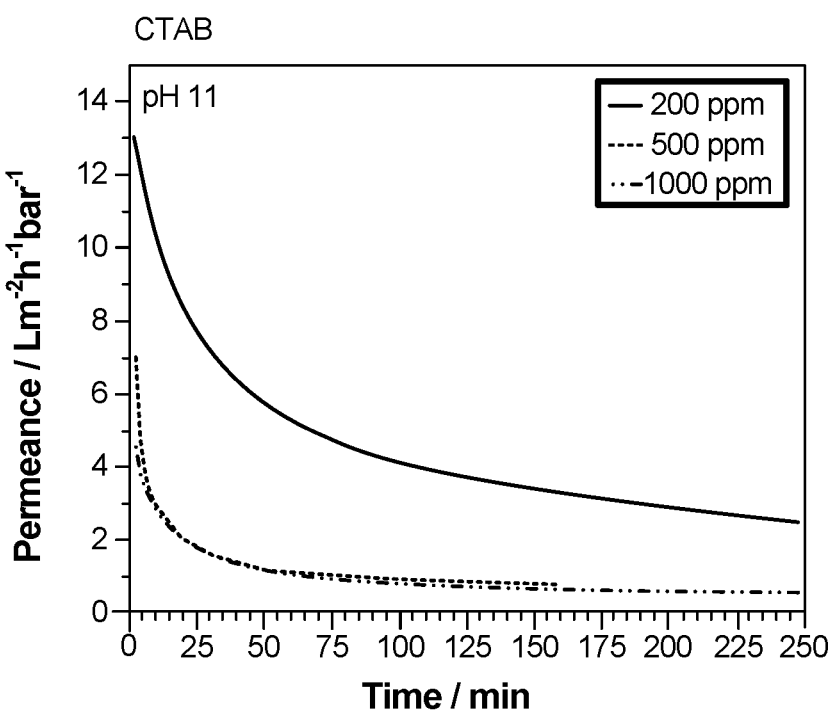
Figure 11E:
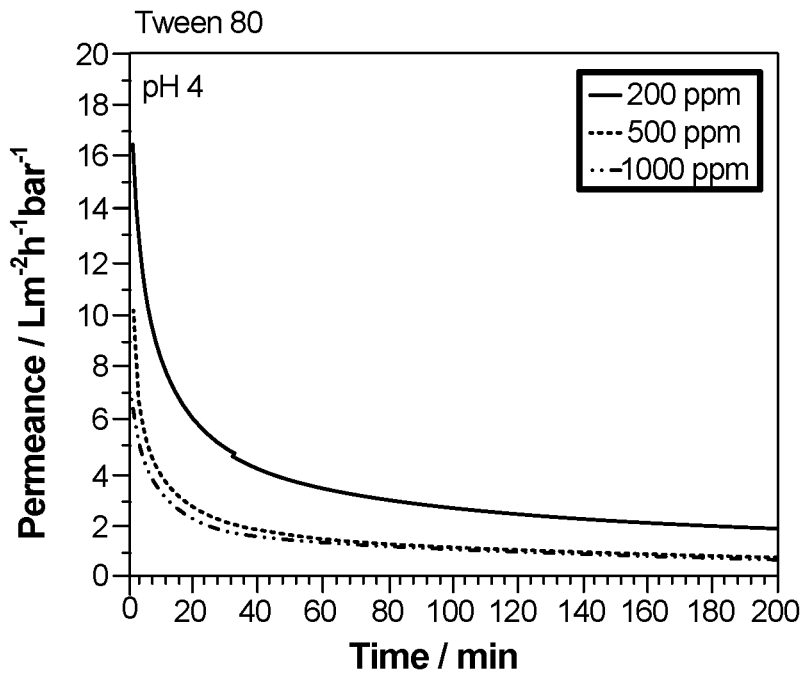
Figure 11F:
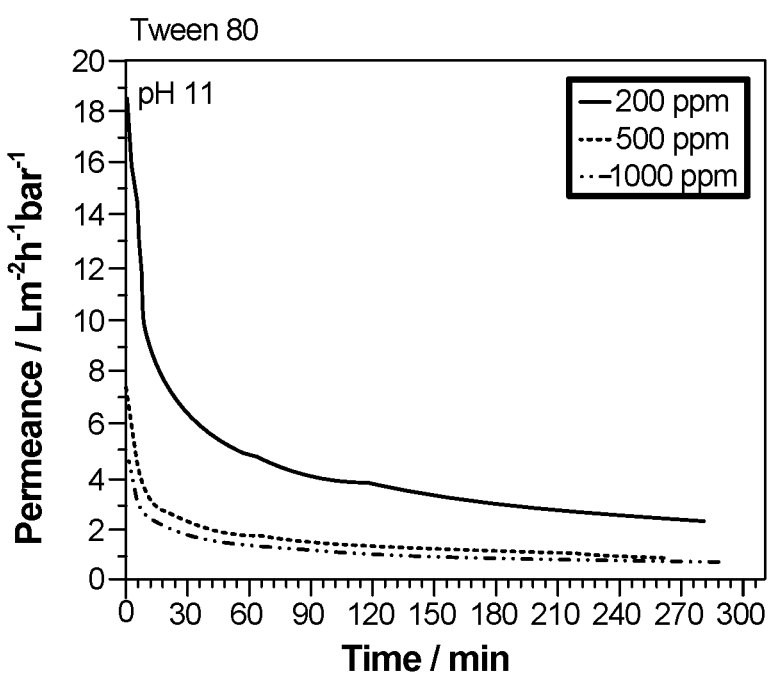
Figure 12A:
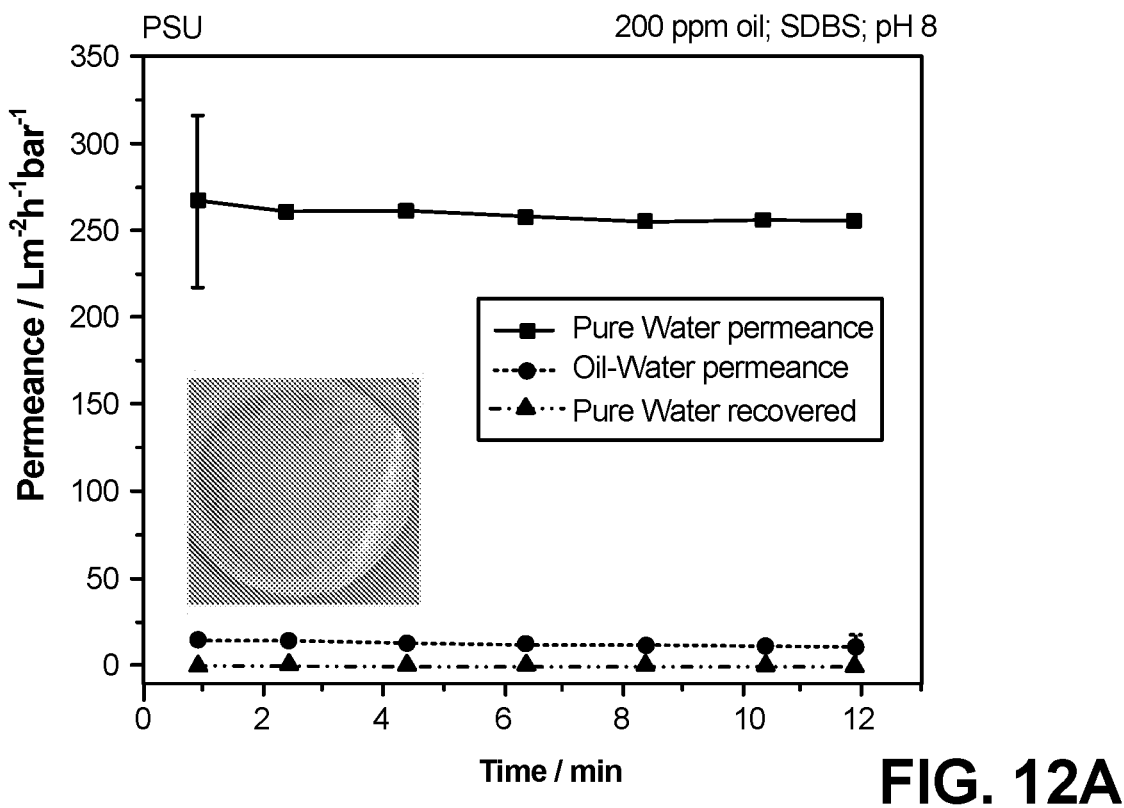
FIGS. 12A-12C are graphical views of pure water permeance, emulsion permeance, and recovered water permeance for PSU and membranes prepared from 2 wt % and 5 wt % solutions with 200 ppm crude oil and 20 ppm SDBS at pH 8 (insets showing rinced membranes after filtration), according to one or more embodiments of the present disclosure.
Figure 12B:
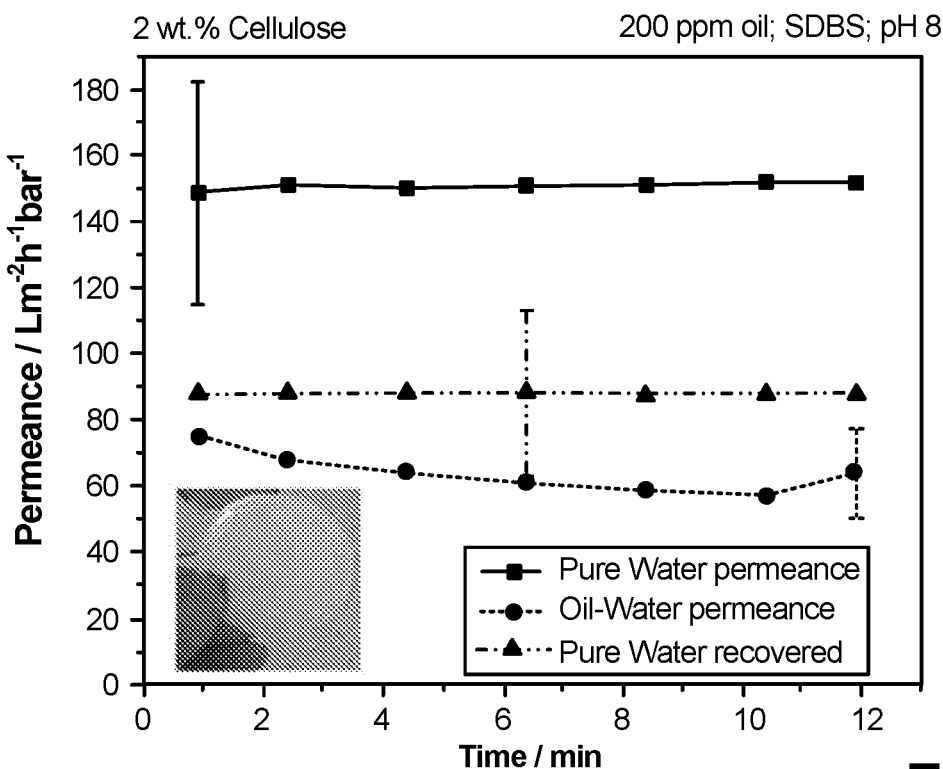
Figure 12C:
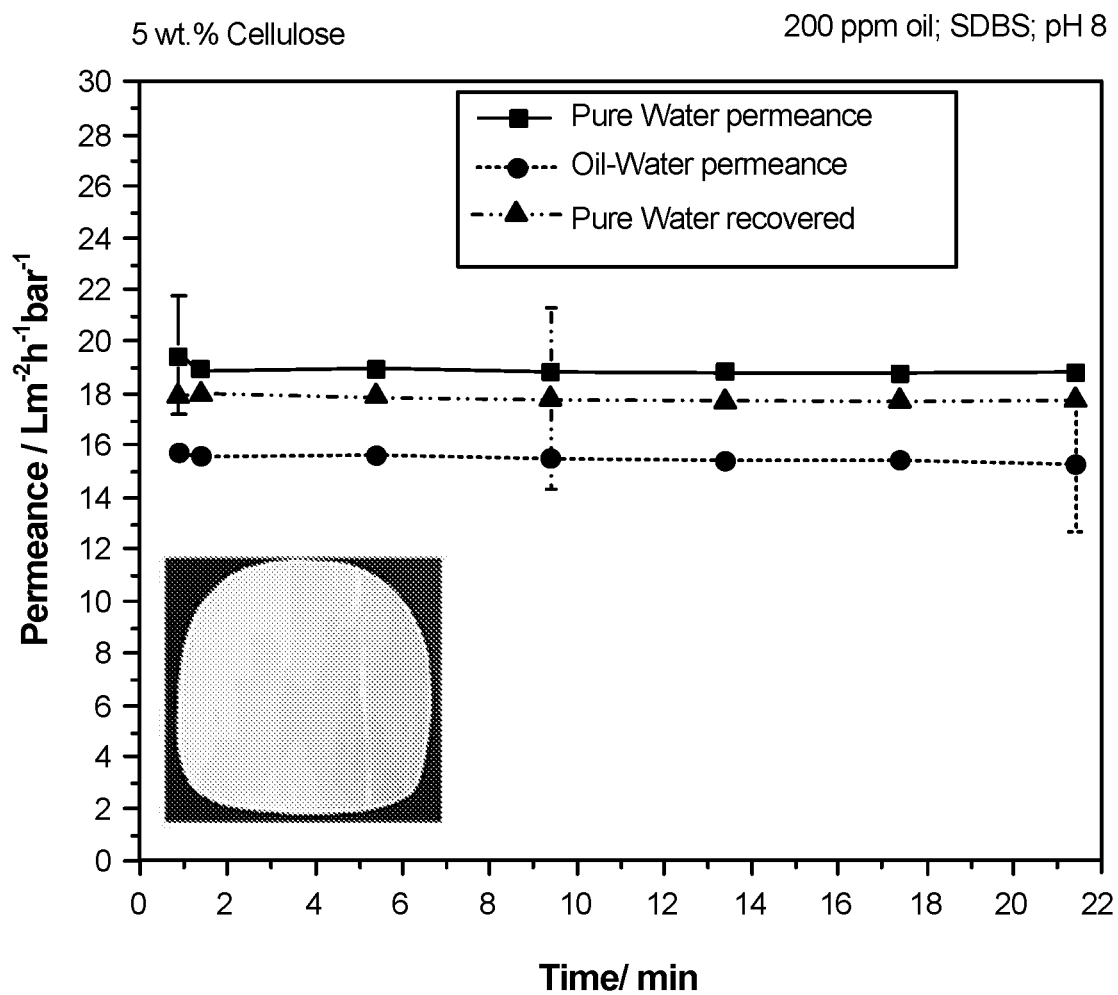

Filtration at pH 4 and pH 11 showed similar trend. Filtration with SDBS had the least flux decline even at higher oil concentrations (FIGS. 10A-10C). This is consistent with the fact that the membrane has a negative zeta potential in the whole pH range above 4.2. More significant permeance decline at pH 8 could be attributed to the concentration polarization and less stable SDBS-oil droplets.

At higher oil concentration the surface coverage with emulsified oil is faster leading to faster flux stabilization. Apart from fouling flux decline can be caused by concentration polarization, as well as membrane being mechanically compressed under pressure in a dead-end set up. A complete flux recovery eliminates a possible contribution of mechanical compression. Similar permeances declines for CTAB and Tween stabilized solutions could indicate that concentration polarization is the reason for decline.

Figure 13A:
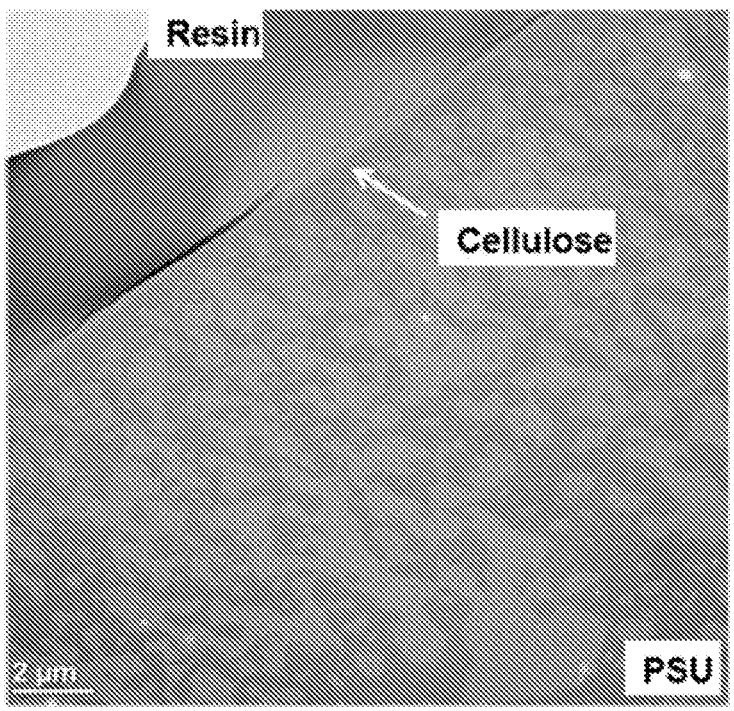
FIGS. 13A-13B are TEM images of membrane cross sections after filatration of oil-water emulsions containing 200 ppm of crude oil and SDBS at pH 8, wherein a 2 wt cellulose membrane is shown in (a) and polysulfone is shown in (b), according to one or ore embodiments of the present disclosure.
Figure 13B:
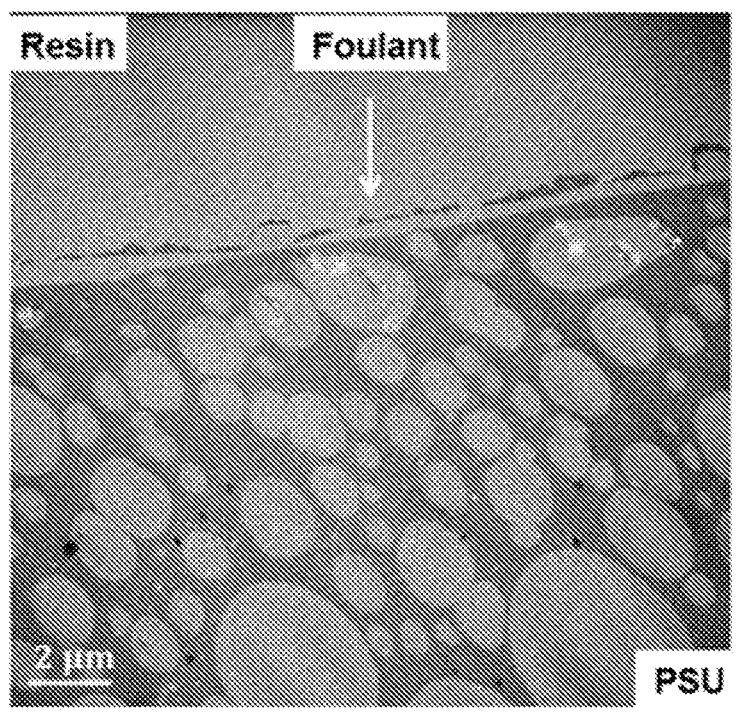

To confirm that emulsified oil did not adsorb to great extend onto the thin cellulose layer, transmission electron microscopy (TEM) was used. (FIG. 13A-13B) Compared to polysulfone, which showed a prominent layer on top of the membrane surface, the cellulose-coated membrane had practically no foulant on the surface. The cross sections of unmodified polysulfone membranes and cellulose-coated membranes after filtering oil-water emulsion, containing SDBS and 200 ppm of crude oil at pH 8 are imaged in FIGS. 13A-13B.

Although PSU had higher initial water permeance and reasonable emulsion permeance, the water permeance recovery was almost zero. This leads to the conclusion that the PSU surface was irreversibly fouled by adsorption and internal pore blockage, which was also visible on the membrane even after rinsing. The membrane with the thinnest cellulose coating (0.4 µm), obtained with 2 wt % cellulose solution, had a water permeance of 150 $Lm^{-2}h^{-1}bar^{-1}$, which is about 60% of the value for the uncoated PSU membrane. The emulsion permeance was much higher than for the uncoated PSU and the recovered flux was around 90 $Lm^{-2}h^{-1}bar^{-1}$. The recovered water permeance for uncoated PSU was close to zero. The membrane coated with 5 wt % cellulose (layer thickness around 0.9 µm) had a reduced initial water permeance, when compared to PSU and the membrane coated with 2 wt % cellulose solution, but its emulsion permeance was similar to PSU and the water flux recovery was more than 90%. The thickness of the cellulose layer affects the permeance. Membranes prepared from 2 wt % and 5 wt % solutions didn't show visual changes after filtration. The polysulfone membrane used for filtration of emulsions containing SDBS have zero flux recovery (FIGS. 10A-10C, 11A-11F, and 12A-12C). Filtration of emulsions containing CTAB and Tween showed similar behavior (data not shown).

Figure 14A:
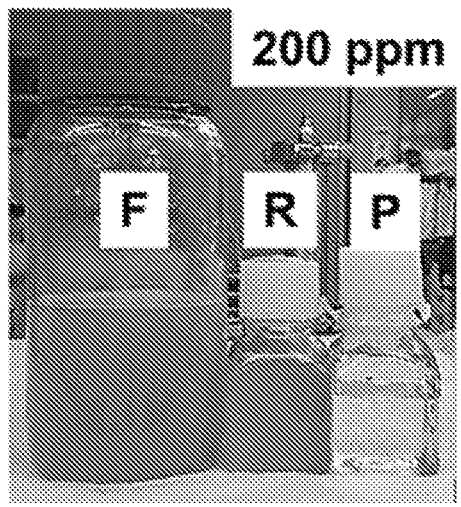
FIGS. 14A-14C are images of (a) feed, (b) retentate, and (c) permeate for emulsions with 200 ppm, 500 ppm, and 1000 ppm crude oil with SDBS at pH 8 filtered through 2 wt % cellulose membranes, according to one or more embodiments of the present disclosure.
Figure 14B:
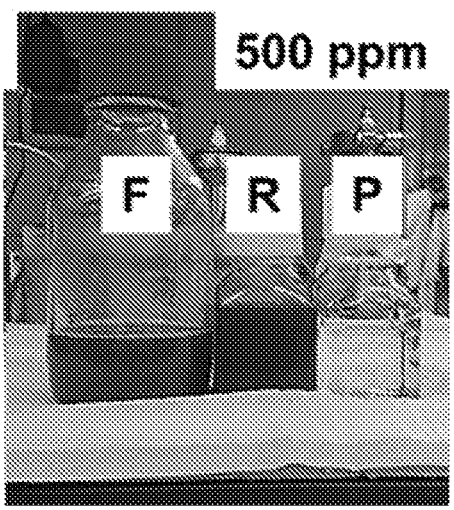
Figure 14C:
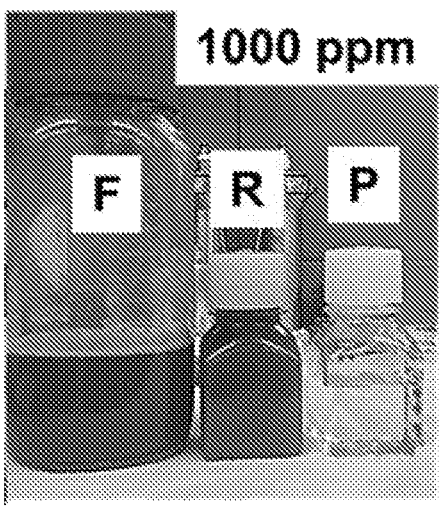

Cellulose membrane from three different coating solution concentrations, 2, 5, and 10 wt %, lead to complete oil removal in all conditions i.e. with cationic, anionic and non-ionic surfactant as well as at pH 4, 8 and 11. The images of 200 ppm, 500 ppm and 1000 ppm feed with SDBS and corresponding permeates, using a 2 wt % cellulose membrane, are shown in FIGS. 14A-14C and Table 4.

TABLE 4

Feed, retentate and permeate concentrations for emulsions with 200, 500 and 1000 ppm oil with SDBS at pH 8 for 2 wt % cellulose membrane.

| Feed oil concentration/ ppm | Retentate oil concentration/ ppm | Permeate oil concentration/ ppm | Permeate Turbidity NTU |
| --- | --- | --- | --- |
| 204 ± 6 | 216 ± 5 | 0 | 0.3 ± 0.1 |
| 412 ± 104 | 397 ± 12 | 0 | 0.1 ± 0.0 |
| 953 ± 113 | 917 ± 97 | 0 | 0.1 ± 0.0 |

The least flux decline and highest permeance were measured with emulsions with SDBS. As mentioned above SDBS is an anionic surfactant and the membrane is negatively charged in practically all investigated pH range. Electrostatic repulsion leads to no significant adsorption onto the membrane surface. The emulsions with SDBS have bigger droplet size than with other surfactants, indicating lower stability. Fluctuations in the feed and retentate values could be due to the least stabilized SDBS-oil droplets while measuring rather larger volume of different sizes with a fluorescence probe. Emulsion containing 200 ppm of oil, stabilized with SDBS was tested with oil extraction method using tetrachloroethylene as extraction solvent.

Feed had approximately 200 ppm of oil, retentate 150 ppm of oil and permeate 3 ppm of oil.

Unmodified ultrafiltration polysulfone membranes exhibited completely irreversible fouling, showing no flux recovery. The membranes were blocked immediately after the start of the emulsion filtration and pure water permeance measured afterwards was significantly less than the initial permeance.

Experiments with 5 and 10 wt % cellulose membranes and emulsion with CTAB and Tween confirmed a complete oil removal with turbidity below 1 NTU for 96% of the permeates and under 5 NTU for 4% of the permeates, which is within the obligatory laws and restrictions issues of WHO, European standards and USEPA. The reason for fluctuations in oil concentration is due to the losses during emulsion preparation and mixing in the laboratory blender.

In sum, a fast forward moving industry and growing demand for both energy and clean water, the so called produced water from oil and gas industry yields enormous amounts of oily wastewater with great potential. Removal of oil from this oily wastewater would provide excessive volumes of water that could be used for irrigation, agriculture and further purification. Micron and submicron sized oil droplets are difficult to remove from the water and majority of techniques are quite expensive, inefficient and require harsh environment.

Membranes show great ability to remove tiny oil droplets from the produced water but they are prone to fouling which is causing shorter lifespan and usage of chemicals for cleaning. Cellulose membranes dissolved in ionic liquid are hydrophilic, smooth green membranes that showed practically complete oil in water separation, high flux recovery ratio and stable oil-water emulsion permeance.

By changing crude oil concentration, pH, type of surfactant and salt addition we investigated the behavior of cellulose membranes that could provide a valuable insight in shaping future experiments in oil separation. One must keep in mind that pH and charge, both of the membrane and solutes, play a significant role in separation efficiency, as well as the type of crude oil and surfactants.

In our case higher oil concentration, acidic pH and anionic surfactant showed the highest flux recovery ratio when compared to flux loss.

For all experiments, in regards to change of pH, surfactant and the crude oil concentration, the oil separation remained 100% which leads to conclusion that membrane surface characteristics is the most important factor in membrane separation technology.

Cellulose membranes also proved stable during real produced water filtration indicating potential use in the downstream oil-water emulsion separation applications.

Example 2

The cellulose/ionic liquid membrane can be scaling up and used for industrial purposes. Ionic liquid are relatively inexpensive and can be compensated with the fact that 80% of ionic liquid can be recovered and reused. The entire process, described below, has the potential to save money and energy.

The following estimates the cost for production of 1 $m^2$ of cellulose/ionic liquid membranes and two potential processes for recovery of ionic liquid, hybrid RO-distillation and distillation alone process calculating only the energy required without considering, e.g., pressure exchanger or booster pump in RO process or energy required for cooling the water in distillation process and the like.

One of the main challenges in membrane technology, besides fouling, is the ability to scale up the process and to reduce consumption of toxic solvents thus having less harsh environmental impact.

Cellulose membranes have the advantage of being comprised of a natural abundant material, available in a variety of forms, including wood pulp. Use of a green solvent such as ionic liquid is less harmful for the environment compared to the common organic solvents.

The economic efficiency of shifting from lab scale to pilot scale membrane fabrication is evaluated below. Using water-soluble ionic liquid with no vapor pressure gives the possibility of waste reduction as ionic liquid can be regenerated. Regeneration of ionic liquid by implementing membrane technology and column distillation can recover 90% of ionic liquid thus minimizing the waste (2.1).

The operational route starts with membrane manufacturing where the goal product is cellulose membrane manufactured with ionic liquid.

Hybrid Process (Membrane Filtration and Distillation)

Figure 15:
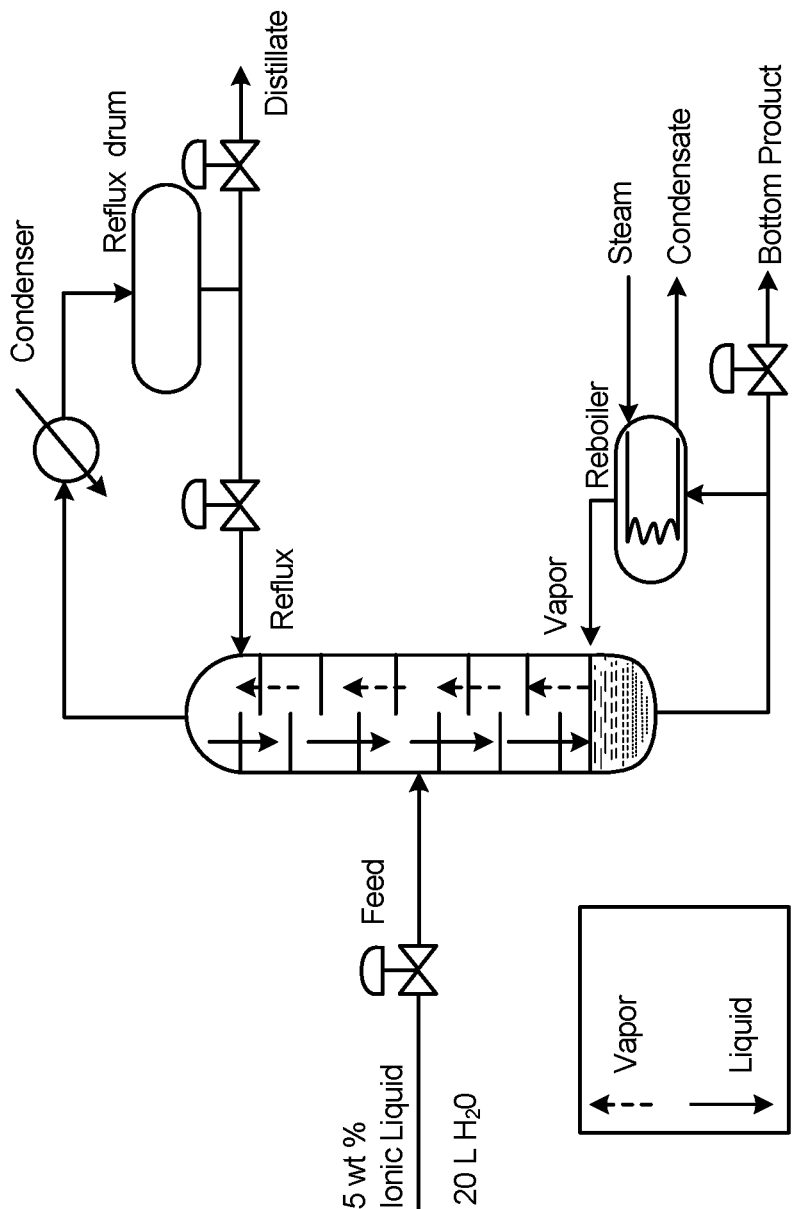
FIG. 15 is a schematic diagram of processes for recovery of ionic liquid by (a) membrane process and (b) distillation process, according to one or more embodiments of the present disclosure.

Membrane Process (FIG. 15).

To prepare 15 m×0.3 m (4.5 $m^2$) of cellulose membrane in a continuous machine 500 ml volume solution containing 5 wt % cellulose and 95 wt % ionic liquid are required, leading to 0.1 wt % ionic liquid in the water bath having volume of 1000 L. For effective distillation the feed entering the column should have 5 wt % ionic liquid. From the mass balance if the feed has 0.1 wt % ionic liquid in 1000 L, and to get a retentate with 5 wt % and 20 L of water, 980 L of water have to be removed (permeate). The osmotic pressure of the retentate is approximately 14 bars calculated from Van't Hoff equation. The proposed membrane could be a RO one (OSMO HR(PA)) from GE. The energy consumption for the aforementioned membrane process would be approximately 3 $kWh/m^3$ if we assume that the energy consumption for RO desalination is between 2.5 and 4 $kWh/m^3$.

Distillation Process (FIG. 15).

A feed containing 5 wt % of ionic liquid and 20 L of water would go into the distillation column. It has been reported that the distillation of [C2mim]OAc can produce 90% yield.

The energy required to heat 20 L of solution (assume 20° C.) to boiling point would be 6.7 MJ (1.8 kWh). The energy required to evaporate 20 L of water to steam at atmospheric pressure would be 45.2 MJ (12.5 kWh). The total energy required to distillate 20 L of solution containing 5 wt % ionic liquid with 90% yield is 51.9 MJ (14.4 kWh). The total energy consumption of a hybrid RO-distillation system is 17.4 kWh.

Distillation Process (Only).

Recovery of ionic liquid could be possible with only distillation. Energy requirement will increase because the feed would have 1000 L of water with 0.1 wt % of ionic liquid. The energy required to heat 1000 L of solution (assume 20° C.) to the boiling point would be 336.0 MJ (93.3 kWh). The energy required to evaporate 1000 L of water to steam at atmospheric pressure would be 2260 MJ (627.7 kWh). The total energy consumption of a distillation system is 721 kWh. The energy consumption tariff for Saudi Arabia for industrial facilities is fixed at 5 US $ cents/kWh.

Although a hybrid RO-distillation process would be more cost effective still distillation alone in Saudi Arabia is not as expensive as it would be in USA (9.43 US $ cents/kWh) or Germany (15.22 US $ cents/kWh).

The advantage of using hybrid system would be less energy consumption, thus decreased gas emission. The disadvantage is the usage of two systems with a more complicated operation, increase in operation and maintenance cost.

The advantage of using distillation as a sole process is simplicity, being a rapid method but rather energy consuming In summary, cellulose membrane manufacture from ionic liquid are susceptible for scale up with estimated cost of 10 $/m$^2$. Using cellulose doesn't cause considerable depletion of natural resources due to, firstly, its abundance; secondly, cellulose can be from wood, pulp or cotton, which is a residue from e.g. wood industry or textile industry. Ionic liquid is a non-volatile and environmentally benign solvent therefore its usage reduced the negative environmental impact. Another advantage of ionic liquid is the possibility of recovery, which minimizes the waste. Hybrid RO-distillation system consumes less energy than distillation alone although distillation is a simpler method. Usage of ionic liquid reduces the release of toxic chemical in the environment based on the fact that ionic liquid is not toxic chemical and that [C2mim] OAc is the least toxic among ionic liquids. By recovering ionic liquid we reduced the waste, minimize negative environmental impact and have more cost efficient process.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. A method of separating hydrocarbons in an aqueous mixture, comprising:
    exposing an aqueous mixture to a cellulose/ionic liquid membrane, wherein the aqueous mixture is oilfield produced water including hydrocarbon droplets smaller than 10 microns, and wherein the aqueous mixture further comprises an anionic surfactant and has an acid pH; and removing the hydrocarbons from the aqueous mixture as the aqueous mixture flows through the cellulose/ionic liquid membrane, wherein the cellulose/ionic liquid membrane prevents the passage of the hydrocarbons through the membrane.

2. The method of claim 1, wherein the hydrocarbon is crude oil.

3. The method of claim 1, wherein a concentration of hydrocarbons in the aqueous mixture ranges from about 200 ppm to about 1000 ppm.

4. The method of claim 1, wherein the aqueous mixture is an oil-water emulsion.

5. The method of claim 1, wherein the aqueous mixture has a pH ranging from about 3 to less than 4.2.

6. The method of claim 1, wherein the aqueous mixture includes the anionic surfactant at a ratio of surfactant to oil of 1:10.

7. The method of claim 6, wherein the surfactant is sodium dodecylbenzenesulfonyl.

8. The method of claim 1, wherein the membrane is prepared with a 5 wt % cellulose solution and exhibits a permeance of about 9-14 $Lm^{-2}h^{-1}bar^{-1}$.

9. The method of claim 8, wherein the cellulose/ionic liquid membrane has a flux recovery is more than 90%.

10. The method of claim 1, wherein about 100% of the hydrocarbons are removed from the aqueous mixture.

11. The method of claim 1, wherein the aqueous mixture further comprises sodium chloride.

12. The method of claim 11, wherein the aqueous mixture comprises several ppm to 300,000 ppm sodium chloride.

* * * * *